(12) United States Patent
Yankovich et al.

(10) Patent No.: US 7,000,179 B2
(45) Date of Patent: Feb. 14, 2006

(54) METHOD AND APPARATUS FOR PROGRAMMATIC LEARNED ROUTING IN AN ELECTRONIC FORM SYSTEM

(75) Inventors: Steve Yankovich, San Jose, CA (US); Edwin Porter, Menlo Park, CA (US); Nathan Hoover, Los Gatos, CA (US)

(73) Assignee: Movaris, Inc., San Jose, CA (US)

( * ) Notice: Subject to any disclaimer, the term of this patent is extended or adjusted under 35 U.S.C. 154(b) by 800 days.

(21) Appl. No.: 10/082,533

(22) Filed: Feb. 22, 2002

(65) Prior Publication Data

US 2003/0110443 A1 Jun. 12, 2003

Related U.S. Application Data

(63) Continuation-in-part of application No. 09/281,147, filed on Mar. 27, 1999, now Pat. No. 6,704,906.

(51) Int. Cl.
*G06F 17/24* (2006.01)
(52) U.S. Cl. .................. 715/500; 715/505; 715/506
(58) Field of Classification Search ............... 715/505, 715/506, 507
See application file for complete search history.

(56) References Cited

U.S. PATENT DOCUMENTS

| | | | |
|---|---|---|---|
| 5,410,646 A | 4/1995 | Tondevold et al. | |
| 5,465,299 A | 11/1995 | Matsumoto et al. | |
| 5,634,064 A | 5/1997 | Warnock et al. | |
| 5,704,045 A | 12/1997 | King et al. | |
| 5,797,133 A | 8/1998 | Jones et al. | |
| 5,862,223 A | 1/1999 | Walker et al. | |
| 5,953,523 A | 9/1999 | Martinez et al. | |
| 5,953,528 A | 9/1999 | Sullivan | |
| 6,021,491 A * | 2/2000 | Renaud ....................... 713/179 |
| 6,070,177 A | 5/2000 | Kao et al. | |
| 6,073,142 A * | 6/2000 | Geiger et al. ............... 715/500 |
| 6,084,585 A | 7/2000 | Kraft et al. | |
| 6,137,488 A | 10/2000 | Kraft et al. | |
| 6,192,381 B1 | 2/2001 | Stiegemeier et al. | |
| 6,253,323 B1 | 6/2001 | Cox et al. | |
| 6,256,614 B1 | 7/2001 | Wecker et al. | |
| 6,272,485 B1 | 8/2001 | Sragner | |
| 6,272,506 B1 | 8/2001 | Bell | |
| 6,279,042 B1 | 8/2001 | Ouchi | |
| 6,295,536 B1 | 9/2001 | Sanne | |
| 6,314,415 B1 | 11/2001 | Mukherjee | |
| 6,360,254 B1 | 3/2002 | Linden et al. | |
| 6,553,407 B1 * | 4/2003 | Ouchi ......................... 709/206 |
| 6,587,841 B1 | 7/2003 | DeFrancesco et al. | |
| 2002/0093458 A1 * | 7/2002 | Amini ......................... 343/787 |

OTHER PUBLICATIONS

Rockley, Ann, et al., Managing Enterprise Content: A Unified Content Strategy, Chapter 17—Workflow Systems, "Processing" (New Riders Publishing, © Oct. 16, 2002).*
Linthicum, David S., Enterprise Application Integration, Chapter 18—Message Brokers—The Preferred EAI Engine (Addison Wesley Publishing, © Nov. 5, 1999).*

(Continued)

*Primary Examiner*—Doug Hutton
(74) *Attorney, Agent, or Firm*—Patentry; Peter G. H. Hwang

(57) ABSTRACT

A system and method for self-directed routable electronic forms is disclosed. The system and method create a heuristically generated routing selection list based on a history of previous routing transactions.

7 Claims, 20 Drawing Sheets

| Userid | Process Type | Title From | Title To | User To | Time Stamp | Action |
|---|---|---|---|---|---|---|
| bsmith | Expense Report | Submitter | Manager | janderson | 11/2/01-13:23:34 | Submit |
| bsmith | Travel Authorization | Submitter | Manager | janderson | 11/21/01-09:32:18 | Submit |
| bsmith | Expense Report | Submitter | Manager | janderson | 12/3/01-10:03:43 | Submit |
| bsmith | Expense Report | Submitter | Manager | jparker | 12/14/01-16:15:04 | Submit |
| bsmith | ECO | Manager | Engineering Dir | smiller | 12/15/01-11:07:24 | Approve |
| bsmith | Travel Authorization | Submitter | Manager | jparker | 12/18/01-12:12:36 | Submit |

PROCESS ROUTING KNOWLEDGE BASE (PRKB) STRUCTURE

OTHER PUBLICATIONS

Padwick, Gordon, et al., Special Edition Using Microsoft Outlook 2000, Chapter 22—Creating and Using Rules (Que Publishing, © May 12, 1999).*

JetForm FormFlow, Version 2.15—"Electronic Forms for the Dynamic Enterprise" (JetForm Corporation, © 1997).*

Compton, M., et al., "Intelligent Validation and Routing of Electronic Forms in a Distributed Workflow Environment", 1994, IEEE, pp. 125-131, Recom Technologies, Inc., Artificial Intelligence Research Branch, NASA Ames Research Center, M/S 260-2, Moffett Field, CA 94035-1000.

Matthews, G, Jason, et al.; Electronic Management of the Peer Review Process; Fifth International World Wide Web Conference May 6-10, 1996, Paris, France; http://www.5conf.inria.fr/fich_html/papers/P55/Overview.html, pp. 1-22.

Pope, Shealagh, et al.; Using the web for peer review and publication of scientific journals, Learning by doing: the Conservation Ecology Project; Sep. 1998; http://www.consecol.org/Journal/consortium.html, pp. 1-10.

* cited by examiner

NON-VISUAL PROGRAMMATIC ELEMENTS

SHOW OR HIDE SIGNATURE LINE & LABEL BASED ON VALUE OF NUMERIC FIELD

```
function ShowSig() {
  var da = this.getField("dollar.amount");
  var li = this.getField("director.signature.line");
  var la = this.getField("director.signature.line.label");

if (da.value > 2000) {
    li.hidden = false;
    la.hidden = false;
  }
  else {
    li.hidden = true;
    la.hidden = true;
  }
}
ShowSig();
```

| Name | Signature | Date |
|---|---|---|
| Submitted by: | | |
| CC Manager(s): | | |
| Product Line Controller: | | |
| Director: | | |
| Controller: | | |
| Director: | | |
| Sr. Director: | | |
| Vice President: | | |
| EVP/SVP/CFO: | | |
| President: | | |

TYPICAL FORM BASED SIGNATURE (APPROVAL ROUTING) LIST

FIG. 12

| Userid | Process Type | Title From | Title To | User To | Time Stamp | Action |
|---|---|---|---|---|---|---|
| bsmith | Expense Report | Submitter | Manager | janderson | 11/2/01-13:23:34 | Submit |
| bsmith | Travel Authorization | Submitter | Manager | janderson | 11/21/01-09:32:18 | Submit |
| bsmith | Expense Report | Submitter | Manager | janderson | 12/3/01-10:03:43 | Submit |
| bsmith | Expense Report | Submitter | Manager | jparker | 12/14/01-16:15:04 | Submit |
| bsmith | ECO | Manager | Engineering Dir | smiller | 12/15/01-11:07:24 | Approve |
| bsmith | Travel Authorization | Submitter | Manager | jparker | 12/18/01-12:12:36 | Submit |

1300

PROCESS ROUTING KNOWLEDGE BASE (PRKB) STRUCTURE

FIG. 13

| Office Courier 3.1.6 | User ID: stevey | Company ID: acme | Main | Logout | Help |

*Form Routing*

Page Hold

*Enter "Cost Center Manager" name for approval*

To: Carol J. Anderson / Carol J. Anderson / Mary Tompson / Pete Sullivan / Choose other user ▼

Subject: New Travel Authorization

From: stevey@acme.com

Message: (optional)

Routing targets based on history

Send (Route Form)　　Cancel　　Reset

FIG. 14

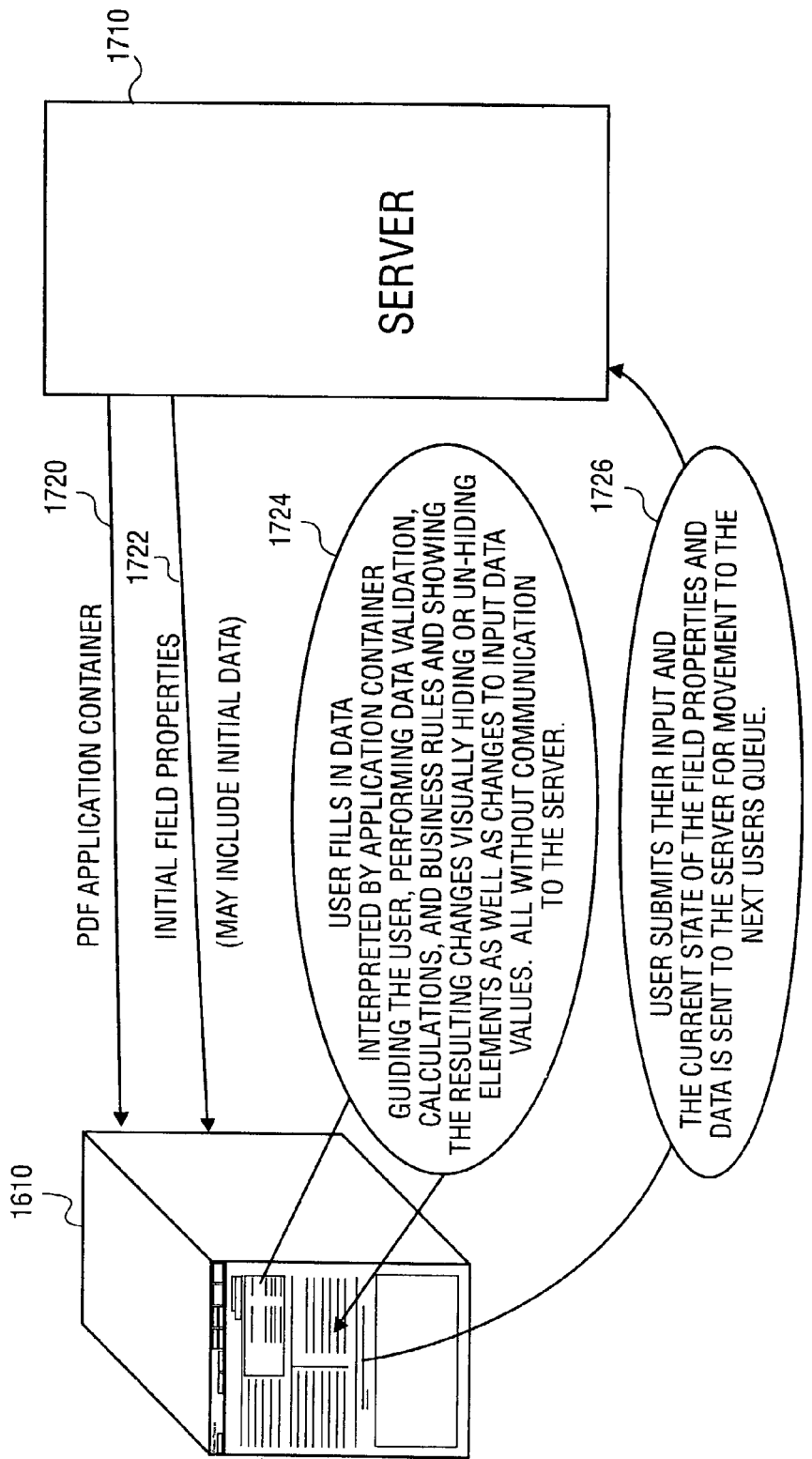

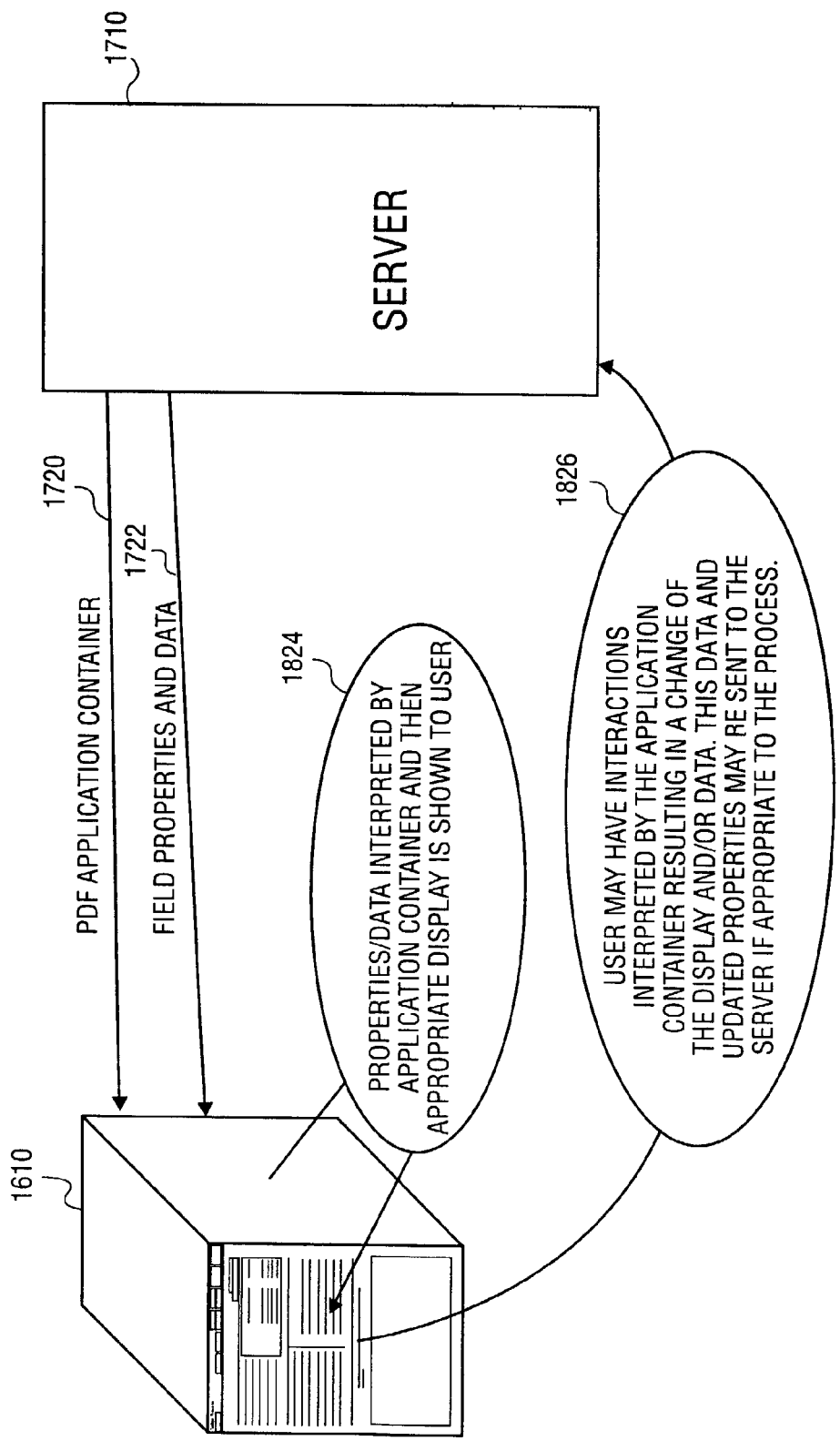

METHOD AND APPARATUS FOR PROGRAMMATIC LEARNED ROUTING IN AN ELECTRONIC FORM SYSTEM

This is a continuation-in-part patent application of U.S. patent application Ser. No. 09/281,147 filed Mar. 27, 1999 now U.S. Pat. No. 6,704,906, entitled "Self-Directed Routable Electronic Form System and Method".

FIELD OF INVENTION

Invention relates to methods and means for conveying electronically visual and graphically displayable user data over a server, and more particularly to electronically displayable forms containing user provided information over a server network.

BACKGROUND OF INVENTION

Traditionally software applications and architectures that accommodate the form flow of electronic forms use server-side programs to determine the processing, or routing, of a given form. These approaches use data and tables stored separately from the electronic form itself to define a set of rules and routing guidelines. In these approaches the server-side program will interpret some data from the electronic form submitted from the client and then using these server-side routing guidelines will perform some task to process the electronic form. An example of this can be found in Jet-Forms use of what are called roles, which are defined using a special software application (separate from the electronic form) called the InTempo Role Builder (defined in white paper http://www.jetform.com/prodsol/whitepapers/intempo_ps.html). These approaches require that all possible routing scenarios are defined ahead of time and that all users within a user community have their roles within those scenarios defined. This pre-defined routing strategy requires a large amount of data that would prohibit inclusion in the electronic form that would be transmitted from one user to another over the server.

Software applications targeted at businesses often provide functionality that automates, via a client (web browser or other client side application)/server model, a collaborative business process where successive users approve or reject information presented to them. Example applications are Enterprise Resource Planning (ERP) applications and large point solutions in the Time and Expense (T&E), Procurement, and Customer Relationship Management space. Example companies in these markets are SAP, PeopleSoft, Siebel, J. D. Edwards, Concur, etc. An example business process where this collaboration is automated would be an Expense Report. For example, a blank Expense Report form may be obtained by a user who then enters data into the Expense Report. The user then needs to route that Expense Report to an approver (like their Manager). The "routing" of the Expense Report may be done by any number of methods in a software (electronic) system.

A common implementation is the concept that each user of the system has a work queue, which is essentially an electronic version of the physical In & Out box a businessperson would have on their desk. In existing software applications, routing is accomplished in the following manner. A user starts a process (fills out a blank form and submits it). The routing of the form to the next user (the first approver) is done in most cases by the system, which looks up the next user by accessing a predefined process map and then moving the electronic form to that user's queue. This predefined routing in most conventional systems needs to be defined beforehand for every user, for every kind of process in the system, and is role specific in that an electronic organization chart must be created. Each user's role (individual contributor, $1^{st}$ to n level manager, Director, VP, SVP, etc.) must be pre-defined in the electronic organization chart so that a process map for each user who may start a process can be defined and followed.

This predefined routing model is flawed in that personnel changes (people leaving the company or changing jobs and responsibility levels) in large organizations are very frequent. A user submitting a new process may cause the system to attempt to route to a user, who five minutes previous left the company. In this case, the process goes into a black hole or the system must allow an adhoc routing back door to get around the out-of-date predefined process.

Thus, a better electronic form routing system is needed, which does not require implementing the complicated, time consuming and high maintenance role based electronic organization chart approach.

SUMMARY OF INVENTION

The present invention permits a Self-Directed electronic form that can guide the user to appropriate routing based on data input on the form all without interaction with a server-side application. As the user inputs data into the electronic form displayed in a viewer (such as a Web browser), visual and non-visual programmatic elements in the form will change based on the data input and will provide visual guidance to the user as to where the form should be routed. This Self-Directed electronic form uses the client machine's processor to interpret input data on the electronic form and execute programmatic elements within the electronic form. Upon user completion of the electronic form, the present invention provides a means and method to visually guide (without server interaction) the user, or submitter, of the electronic form to provide a server-side application in preparing the form for the next user. The electronic form is then routed to the next user(s) via that server-side application using electronic messaging to provide a link to the filled-in electronic form submitted by the previous user. The next user, or approver, then displays the electronic form in a viewer, such as a Web browser. The present invention generates in the approver's view of the form appropriate visual elements corresponding with allowable actions of this subsequent viewer. The present invention also provides visual clues as to the next routing destination based on the electronic form's currently filled-in data, or based on any changes the approver makes to fill-in data, all without server interaction. This sequence continues until the electronic "form flow" is complete and an end point is reached. The present invention further provides a heuristically generated selection list to facilitate routing an electronic form.

BRIEF DESCRIPTION OF DRAWINGS

FIG. 5 is an example of a programmatic element added to the electronic form of FIG. 4.

FIG. 12 illustrates an example of a typical form-based signature list.

FIG. 13 illustrates one embodiment of a structure of the process transaction history.

FIG. 14 illustrates an example of the heuristically generated selection list.

FIGS. 16–18 illustrate the architecture and process used by application containers of one embodiment of the present invention.

DETAILED DESCRIPTION OF THE PREFERRED EMBODIMENT(S)

A computer network-based system and method for self-directed routable electronic forms is disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, circuits, processes and interfaces have not been shown or described in detail in order not to unnecessarily obscure the present invention.

Figure 1:
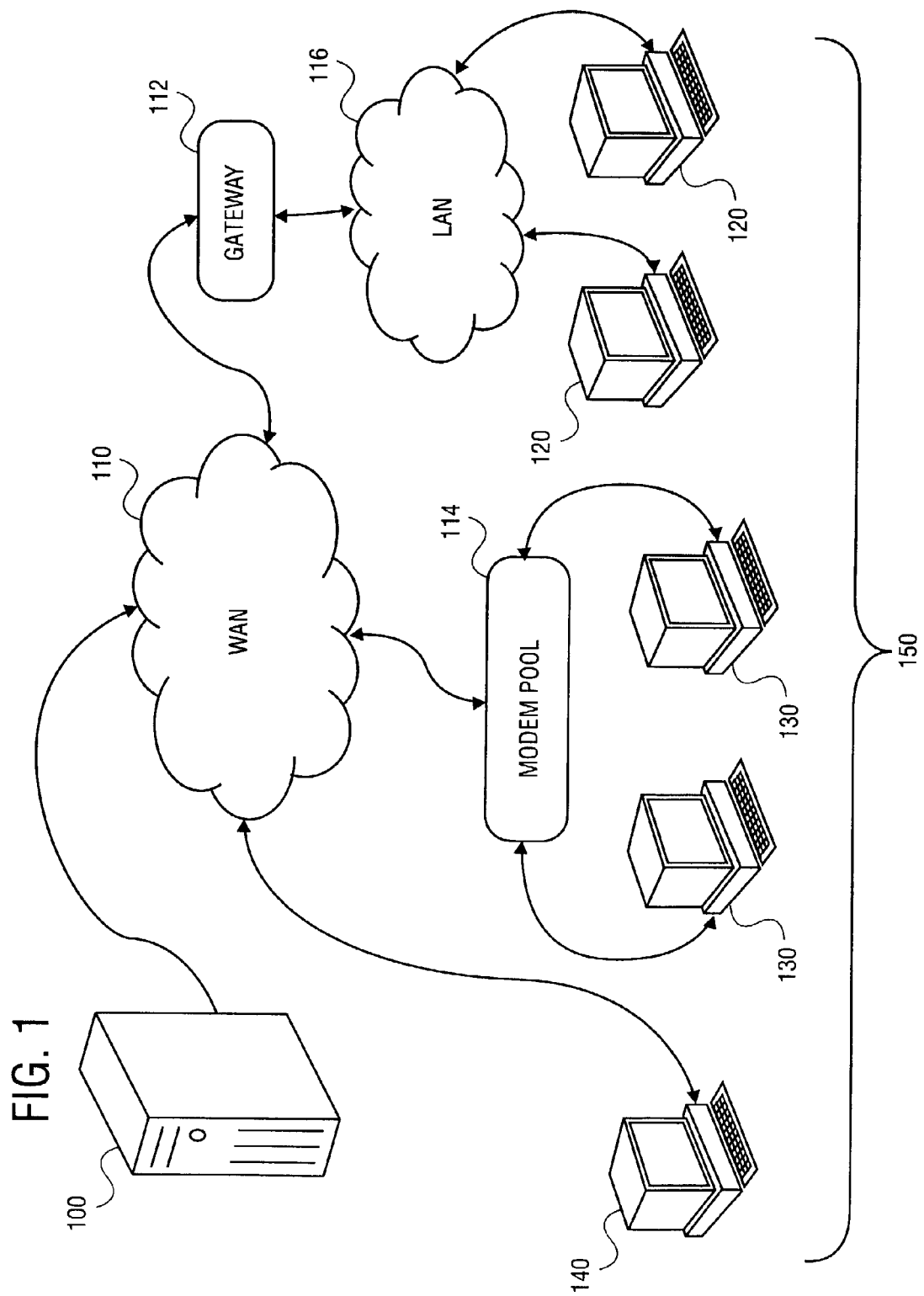
FIG. 1 is an exemplary conventional network infrastructure.

Referring now to FIG. 1, a diagram illustrates one embodiment of a network environment in which the present invention may operate. In this conventional network architecture, a server computer system 100 is coupled to a wide-area network 110. Wide-area network 110 includes the Internet, or other proprietary networks including America On-Line™, CompuServe™, Microsoft Network™, and Prodigy™, each of which are well known to those of ordinary skill in the art. Wide-area network 110 may include conventional network backbones, long-haul telephone lines, Internet service providers, various levels of network routers, and other conventional means for routing data between computers. Using conventional network protocols, server 100 may communicate through wide-area network 110 to a plurality of client computer systems 120, 130, 140 connected through wide-area network 110 in various ways. For example, client 140 is connected directly to wide-area network 110 through direct or dial-up telephone or other network transmission line. Alternatively, clients 130 may be connected through wide-area network 110 using a modem pool 114. A conventional modem pool 114 allows a plurality of client systems to connect with a smaller set of modems in modem pool 114 for connection through wide-area network 110. In another alternative network topology, wide-area network 110 is connected to a gateway computer 112. Gateway computer 112 is used to route data to clients 120 through a local area network (LAN) 116. In this manner, clients 120 can communicate with each other through local area network 116 or with server 100 through gateway 112 and wide-area network 110.

Using one of a variety of network connection means, server computer 100 can communicate with client computers 150 using conventional means. In a particular implementation of this network configuration, a server computer 100 may operate as a web server if the World-Wide Web (WWW) portion of the Internet is used for wide area network 110. Using the HTTP protocol and the HTML or XML coding language across wide-area network 110, web server 100 may communicate across the World-Wide Web with clients 150. In this configuration, clients 150 use a client application program known as a web browser such as the Netscape™ Navigator™ formerly published by Netscape Corporation of Mountain View, Calif., the Internet Explorer™ published by Microsoft Corporation of Redmond, Wash., the user interface of America On-Line™, or the web browser or HTML/XML translator or any other well-known supplier. Using such conventional browsers and the World-Wide Web, clients 150 may access image, graphical, and textual data provided by web server 100 or run Web application software. Conventional means exist by which clients 150 may supply information to web server 100 through the World-Wide Web 110 and the web server 100 may return processed data to clients 150.

Figure 2A:
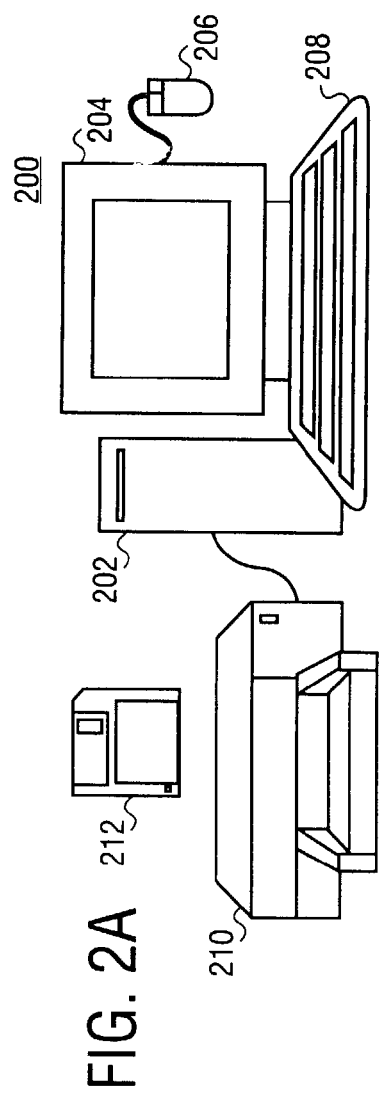
FIGS. 2A–2B illustrate an exemplary computer system architecture.
Figure 2B:
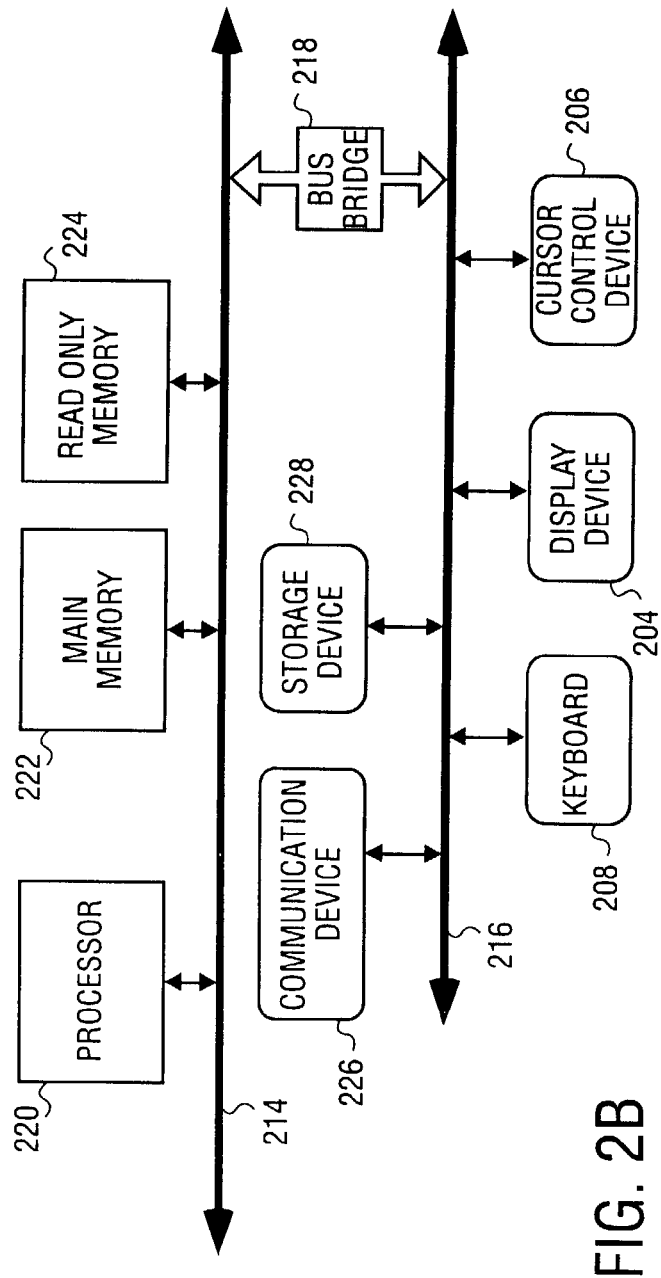

Having briefly described one embodiment of a network environment in which the present invention may operate, FIGS. 2A and 2B illustrate an example of a computer system 200 illustrating an exemplary client 150 or server 100 computer system in which the features of the present invention may be implemented. Computer system 200 is comprised of a data bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 may also comprise a read only memory (ROM) and/or other static storage device 224 coupled to bus 214 for storing static information and instructions for processor 220.

An optional data storage device 212 such as a magnetic disk or optical disk and its corresponding drive 228 may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, or graphical depictions of data and other types of image, graphical, or textual information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 150 can be implemented as a network computer or thin client device, such as the WebTV Networks™ Internet terminal, the Oracle™ NC, a personal digital assistant (PDA), or mobile communication device, such as a cellular telephone. Client 150 may also be a laptop or palm-top computing device, such as the Palm Pilot™. Client 150 could also be implemented in a robust cellular telephone, where such devices are currently being used with Internet micro-browsers. Such a network computer or thin client device does not necessarily include all of the devices and features of the above-described exemplary computer system; however, the functionality of the present invention or a subset thereof may nevertheless be implemented with such devices.

A communication device 226 is also coupled to bus 216 for accessing remote computers or servers, such as web server 100, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 100 via a conventional network infrastructure such as the exemplary infrastructure illustrated in FIG. 1 and described above.

The system of the present invention includes software implemented on information processing hardware and using various processing steps, which will be described below. The features and process steps of the present invention may be embodied in machine or computer executable instructions. The instructions can be used to cause a general purpose or special purpose processor, which is programmed with the instructions to perform the steps of the present invention. Alternatively, the features or steps of the present invention may be performed by specific hardware components that contain hard-wired logic for performing the steps, or by any combination of programmed computer components and custom hardware components. While embodiments of the present invention will be described with reference to the World-Wide Web, the method and apparatus described herein is equally applicable to other network infrastructures or other data communications systems.

Figure 3:
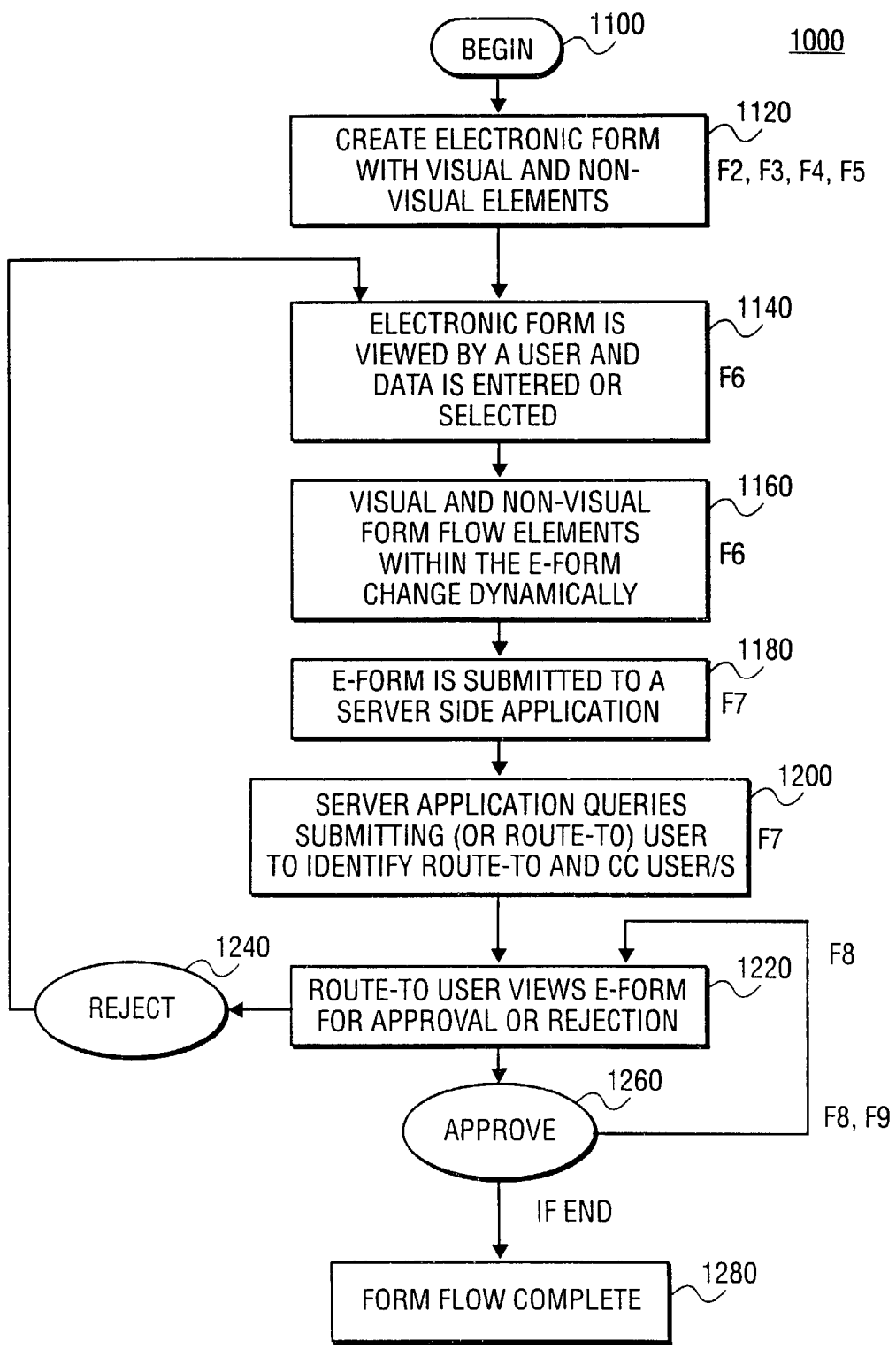
FIG. 3 is a flow diagram of the creation of a self-directed routable electronic form through the automated use of that electronic form in accordance with the present invention.

The present invention is a computer network-based system and method for self-directed routable electronic forms. Referring to FIG. 3, a flow diagram illustrates the creation of a self-directed routable electronic form and the automated use of that electronic form in accordance with the present invention.

In one embodiment of the present invention, an adhoc routing technique is used as the predominant approach. In an adhoc routing system, instead of looking up the next user, the current user (or submitting user in our example) is prompted for the identity of the next user. In one embodiment of the present invention, this is referred to as self-directed adhoc routing. In such a system, the theory is that each user knows the identity (proper name, user id, etc.) of the next person in the process. The adhoc system will also allow for predefined positions in a process where users will not be likely to know the identity of an individual for particular positions in the process. An example is the last routing position of an Expense Report, which is commonly the Accounts Payable department.

FIG. 3 illustrates a flow diagram of self-directed routable electronic form system provided in accordance with the principles of this invention. The significant steps of this flow are further detailed in FIGS. 4–11. As shown in FIG. 3, the present invention permits a self-directed routable electronic form that can guide the user to appropriate routing based on data input on the form without interaction with a server-side application. Once invoked to start in step 1100, self-directed electronic form system 1000 begins to create an electronic form (E-Form), the form generation to be described in further details with reference to FIGS. 4–11. Once created, self-directed electronic form system 1000 then in step 1140 displays that created form in a viewer, such as a Web browser, thus allowing the user to provide data input to the form. Then, in step 1160, visual and non-visual programmatic elements of the form are changed in response to receiving user data. In step 1180, the completed form is submitted to the server-side application, and then in step 1200, visual guidance is provided to the user regarding where the form should be routed using the processor of the user's machine to interpret user input data. In step 1220, server-side application then routes the form to a subsequent user for that user's data entries, such as additional data input, or user approvals or rejections, using electronic messaging to provide a link to the filled-in electronic form submitted by the previous user. For example, in response to a user's rejection entry, the electronic form is routed back to step 1140 to again request user data input. Otherwise, if the user approves the form in step 1260, self-directed electronic form generation system 1000 returns to step 1220 for next user approval. The next user, or approver, then displays the electronic form in a viewer, such as a Web browser, and step 1220 is repeated until all needed user approvals are received, and process ends in step 1280.

Figure 4:
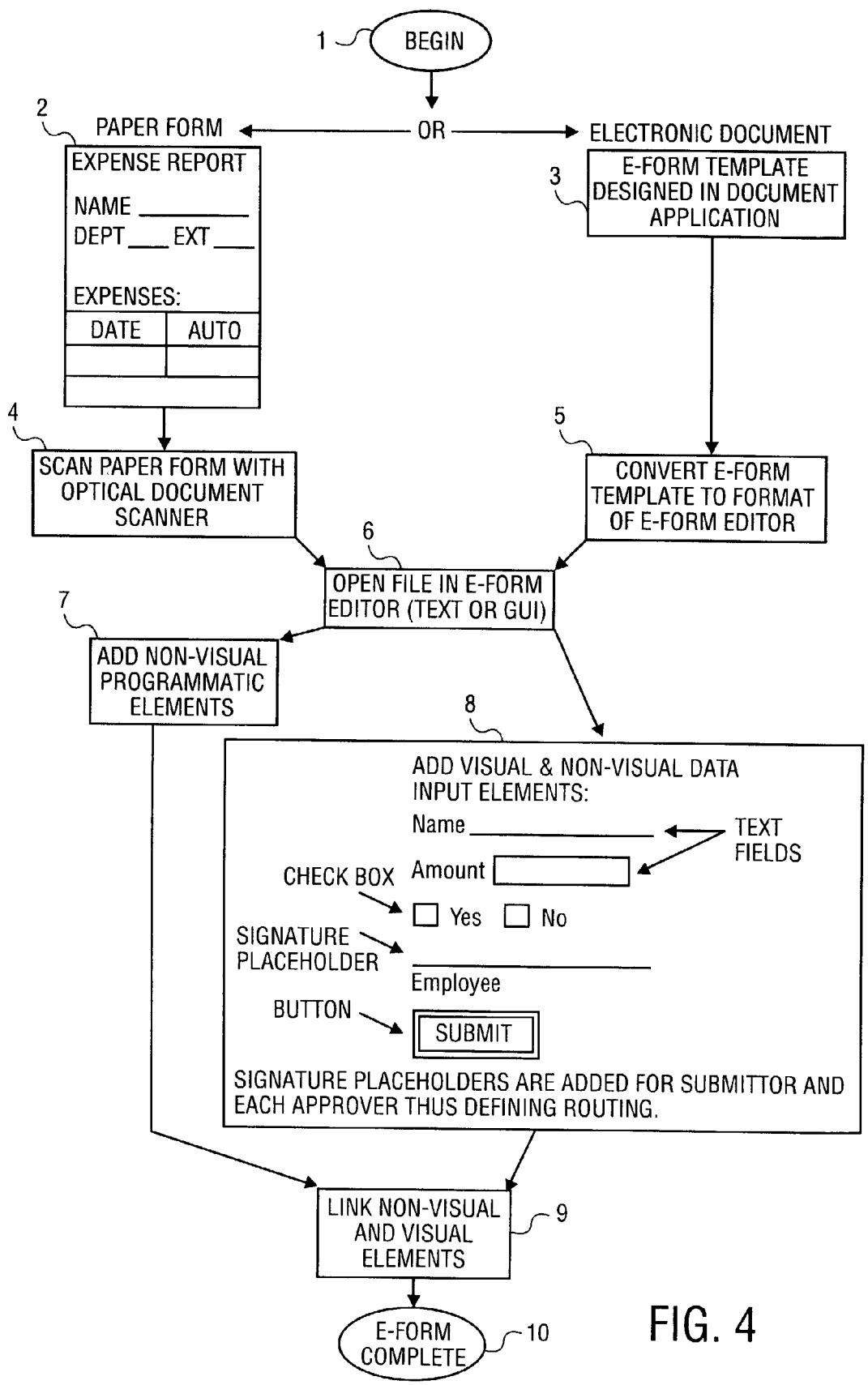
FIG. 4 is a block diagram illustrating the process of creating an electronic form of FIG. 3.

FIG. 4 is a block diagram illustrating process 1120 of creating an electronic form of FIG. 3. The present invention assumes the existence of an electronic file of some format (e.g. HTML, XML, Acrobat PDF, GIF, MS Word, etc.), that is a facsimile of a paper form 2. In step 3, an electronic file corresponding to form 2 may be created in a document editor/viewer, or created in step 4 by scanning paper form 2 with an optical scanner. Scanning a document (form) can result in one of many binary image file formats (e.g. TIFF, JPEG, BMP, etc.) or the scanning result may be produced directly into a format that allows native electronic form construction (e.g. Adobe's Acrobat PDF and Acrobat Form Tool). In step 5, applications such as Acrobat convert the electronic document, or image, formats to their native file format, wherein the source target electronic file format (E-form source) for the electronic form supports the inclusion of both visual elements and non-visual programmatic elements, thereby providing a form that can be both viewed and filled in on a computer screen. This E-form source may therefore be a computer language (e.g. HTML, XML, C++, etc.) and thus a text file, or a proprietary binary format that is accompanied by a specific viewer/editor (e.g. Adobe PDF and Acrobat). The E-form source would be opened in step 6 in a viewer/editor, suitable to the format of the file to "author" the visual and non-visual elements of the E-form. The E-form source also supports in step 7 the addition of non-visual programmatic elements. These programmatic elements are implemented, for example as shown in FIG. 5, with a computer language script 7A, such as in, e.g. Java, JavaScript, HTML, XML, etc., and must be executable on a client machine (the machine the user uses to view/complete the E-form), and accept data filled into electronic form 8 (FIG. 4), visual and non-visual data input elements on the E-form.

Figure 6:
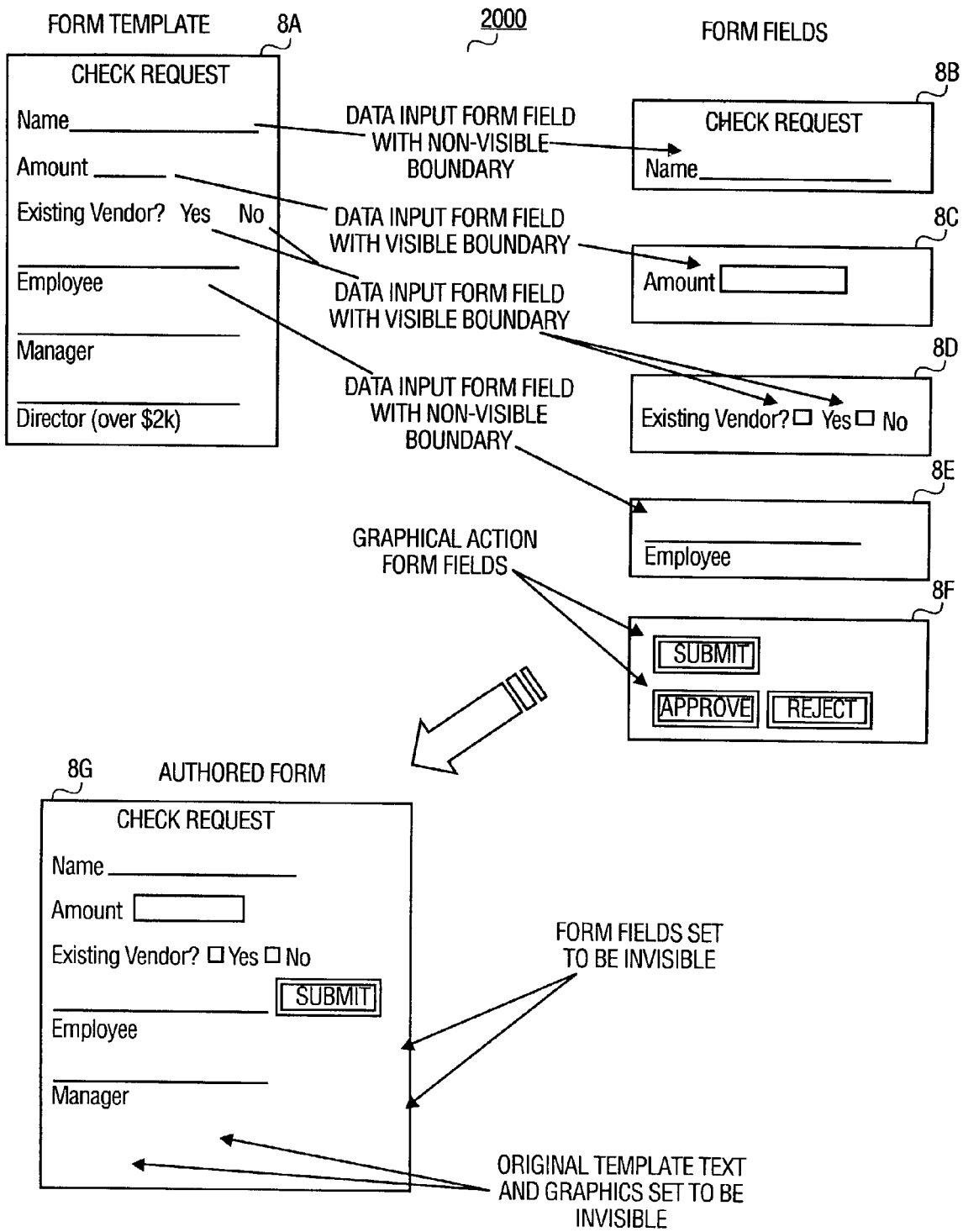
FIG. 6 is an illustration of various data input elements added to the electronic form.

FIG. 6 is an illustration of various data input elements added to the electronic form. As shown in FIG. 6, the E-form source of the present invention supports the addition of data input elements of form 8, which can also be referred to as form fields 8A–8G. Form fields 8A–8G mostly comprise data input form fields that allow the input of textual data 8B/8C/8E (e.g. names, dates, numbers, etc.). These text fields can have visual clues (e.g. underline, box, etc.), as on a paper form, so as to guide the user as to where data goes. Often these physical clues are part of the form template and so the boundary of the added form field is not visible. Text fields may also be accompanied by labels 8B–8F, which cannot be edited by the end user of the E-form. These labels are often part of the original form document, or template, but can also be added as form fields. Visual elements can also comprise graphical form fields, such as buttons 8F, 8D check boxes and list boxes. These graphical form fields can either cause an action (e.g. the execution of a non-visual programmatic element) or facilitate the selection of data (similar to textual entry but via interactive graphical selection). When all form fields to guide the user, and capture data, have been added to the E-form 8G, various form fields could have their visibility flags set such that they are not visible. These invisible form fields will be made visible based on data input, or actions initiated by other form fields, either by user input or by a server-side application that processes E-form 8G.

Figure 7:
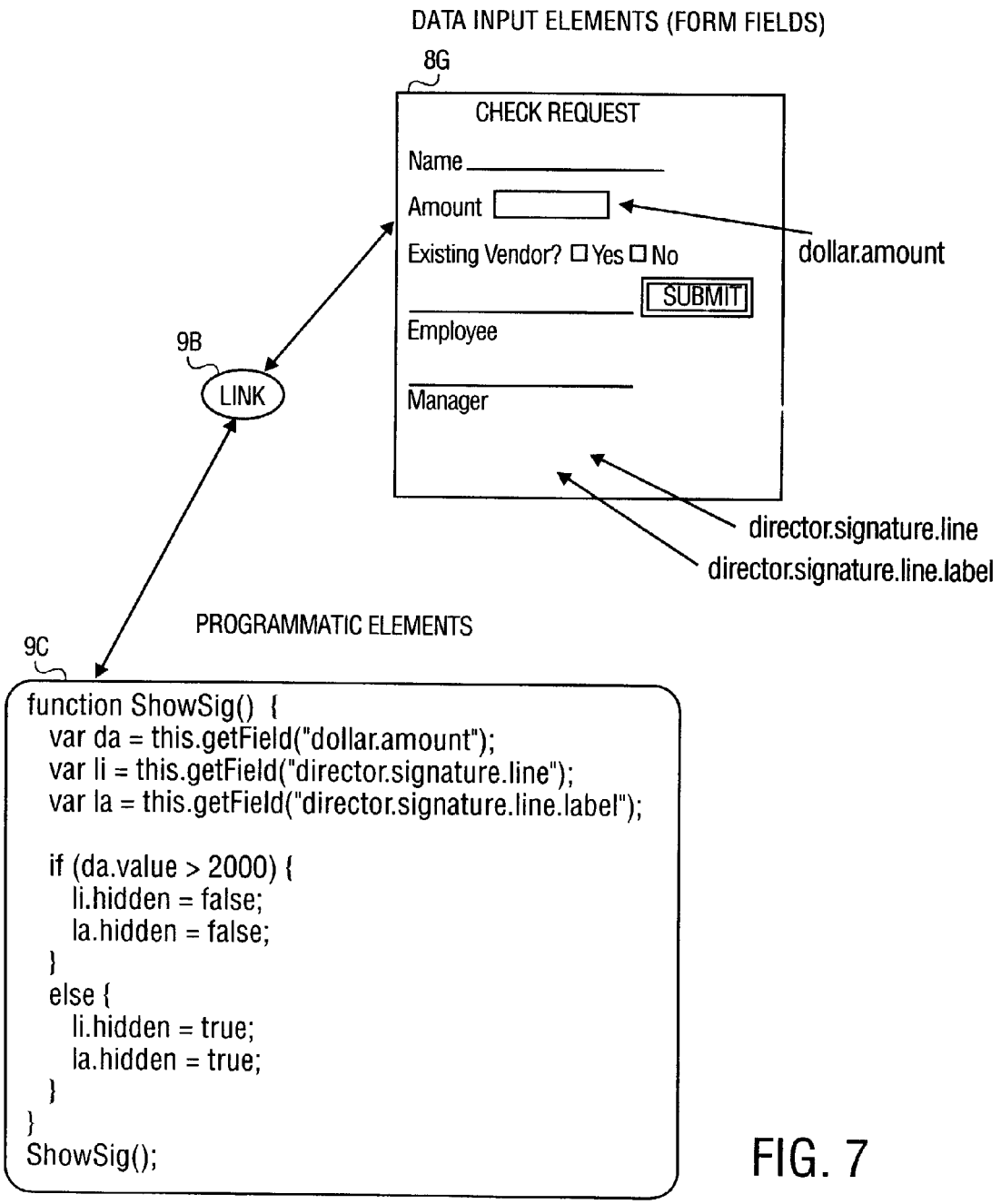
FIG. 7 is an illustration of the linking of a programmatic element with data input elements.

FIG. 6 illustrates a sample form generation and routing process 2000 requiring a signature, or approval via visual elements, such as 8A–8G (form fields) that is commonly found on paper-based forms. It is common to find several signature lines on a paper-based form that signify the routing for signatures, or form flow, that will be required to process the form. In the case of the present invention, these form fields include signature lines (i.e., 8E) that are made visible based on generating non-visual programmatic elements process 9C (FIG. 7). Linking process 9B links these non-visual programmatic elements and the signature form fields such that the programmatic elements 9C use input data from the various text and graphical fields to determine the visibility state of form fields. A common business rule that determines the form flow (or signature routing) for a business form, for example, is a dollar amount 8C of FIG. 6 associated with the forms purpose. In the example form 8G, the value of the form field named dollar.amount is used in the programmatic element 9C to make visible the additional signature required for dollar amounts over $2 k. The form fields director.signature.line and director.signature.line.label are made visible or invisible based on process 9C. All possible signature/approval form fields are in E-form 8G, but the business rules coded into the programmatic elements process 9C will make visible some or all based on the data input to E-form 8G by the initial submitter, or subsequent route-to users of the E-form.

FIG. 7 is an illustration of the linking of a programmatic element with data input elements. Non-visual and visual elements linking process 9B provides a stand-alone E-form that dynamically changes both programmatic and visual elements based on form fill-in data all on the local client processor without communication with a server. Linking process 9B that provides the E-form with the ability to go through dynamic visual and non-visual elements changes can be done via implementation with browser supported languages (e.g. HTML and Java) or by a native application written in C or C++. Various E-form file formats are provided, e.g. Acrobat PDF and HTML, to support linking process 9B and local client execution of programmatic elements. The present invention uses this ability along with the ability to make visual elements either visible or hidden to guide the routing of the E-form. The routing of the E-form in the present invention is self-directed. That is to say, the user completing, or viewing, the form will take action to route the form based on visual clues provided on the form. The E-form routing path is therefore flexible and dynamic. Once all items of E-form requiring user input have had form fields applied and all visual and non-visual elements are included, E-form authoring is completed (see back to step 10 of FIG. 4.) and can be made available to users.

Figure 8:
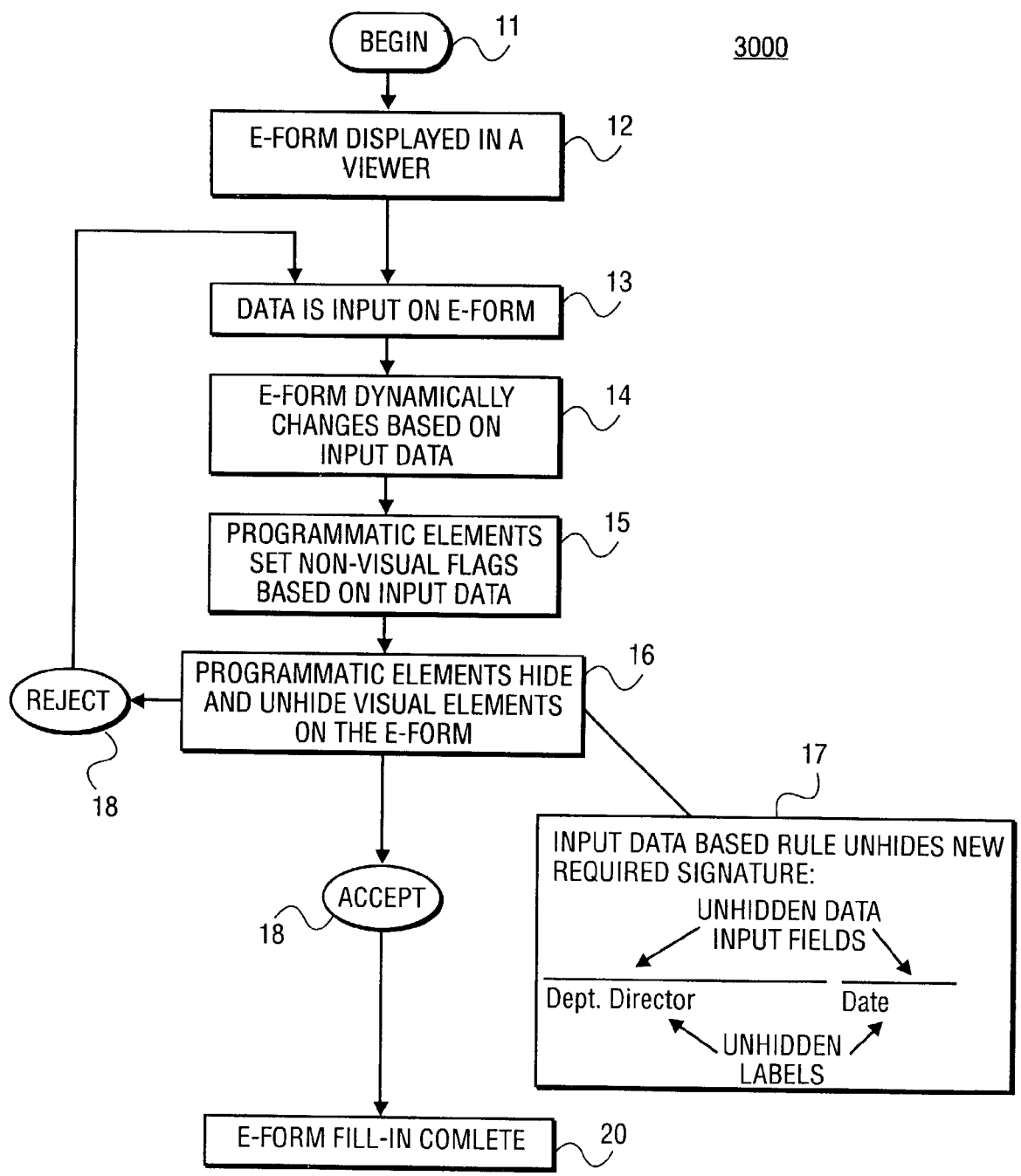
FIG. 8 is a flow diagram of data entry stage of a blank electronic form until the form is complete for submission to a routing process.

FIG. 8 is a flow diagram of the use, or fill-in, of a blank electronic form until the form is completed for submission to a routing process. FIG. 8 illustrates, in step 12, the completely authored E-form 8G of FIG. 7 that is displayed in a viewer for a user to fill-in and submit the E-form to a server-side application. For this purpose the E-form 8G is displayed in a viewer (e.g. Web browser, Adobe Acrobat) appropriate to the corresponding E-form file format (e.g. HTML, XML, Acrobat PDF). Data for E-form is provided in step 13 by the user entering text into form fields and by clicking on various graphical form fields (such as 8B–8F of FIG. 6). As data is entered/selected by the user on E-form 8G, step 14 invokes programmatic elements process 9C to dynamically change the visual appearance of E-form 8G. These visual changes to E-form 8G during fill-in help guide the user to correctly complete the fill-in. In step 15, the form fields representing approval signatures have non-visible visibility flags that are set based on this input data. As the E-form data completion takes place, any entry of data into a field linked to a programmatic element will cause that program to execute, on the client machine, immediately, and in step 16, hide or expose visual elements of the form. These visual changes to E-form 8G may cause the user to change some of the data just entered, thus in step 18 rejecting the current fill-in. The present invention is based on the E-form's self contained (without server interaction) ability to hide and expose approval signature graphical elements 17 (signature line, signature label, date line, and date label) which then guide the current user as to appropriate routing to subsequent users. Once all data has been input to the E-form, and thus all visual aspects of the form are acceptable to the current user, the E-form will be visually stable and the E-Form data entry stage considered complete in step 20.

Figure 9:
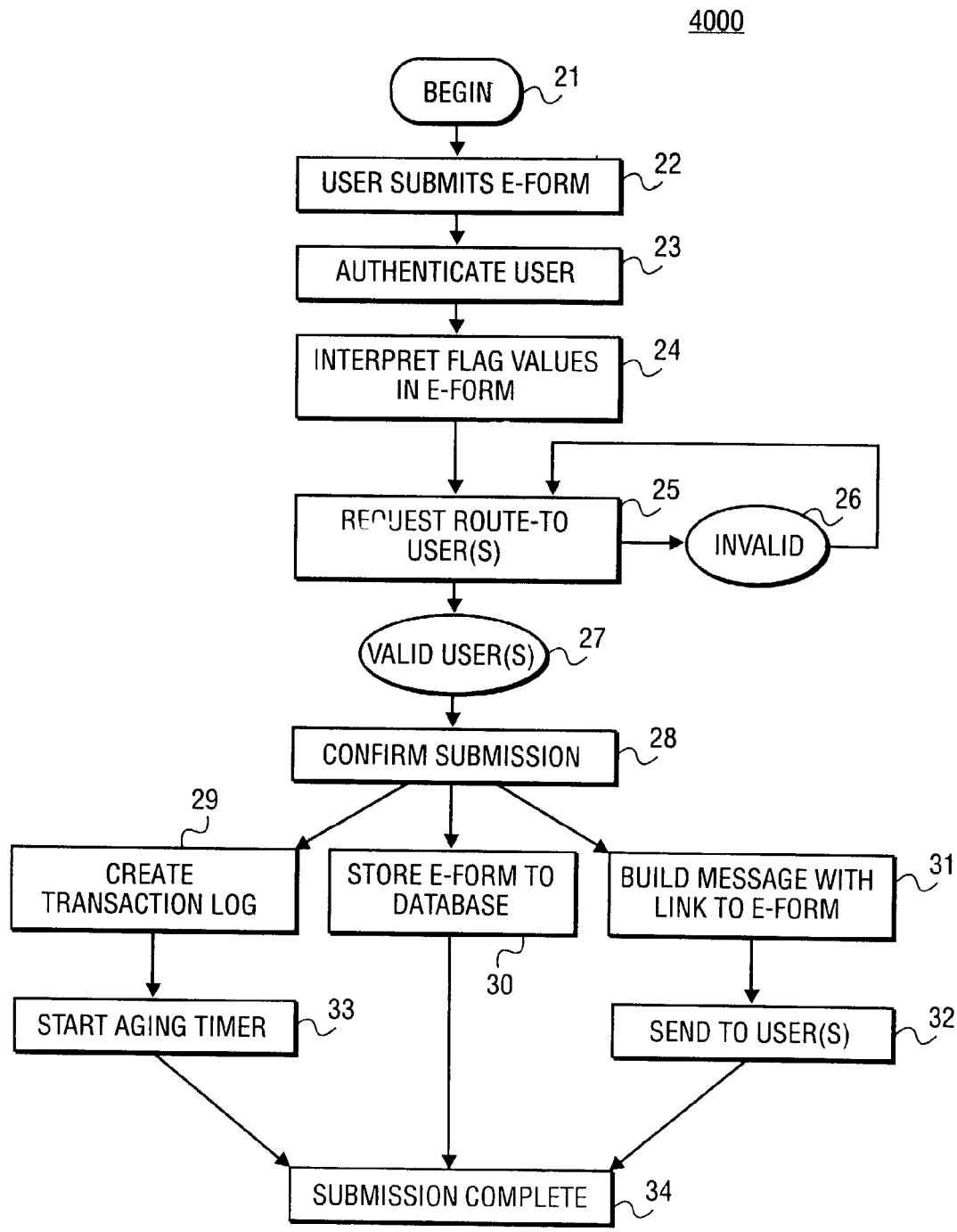
FIG. 9 is a flow diagram of a completed form's submission to a server based routing process.

FIG. 9 is a flow diagram of a completed form's submission process 4000 to a server-based routing component resident in a server-side application. With the E-form having its data entry stage completed, a method for the submission of the completed data to a server-side application allows implementation of an electronic form flow, or routing of the E-form. In step 22, submission of data to a server-side application is initiated such as via a graphical button labeled submit. In performing the step 22 submit action, via clicking on this button, a programmatic element within the E-form will transmit a request to submit the completed data to a server-side application. The transmission of this request, or data, to and from the E-form could be implemented with hypertext transfer protocol (HTTP) if the E-form is used from a Web browser. In this implementation, the E-form element that submits a request, or data, to the server-side application sends the request to a specific port of a server machine. On that server machine, a Web server is listening to that port for requests. In the preferred implementation of the form flow server-side application, step 23 requires user authentication by requesting a user identification (id) and a user password. This user authentication could be implemented by querying the user via a Web browser for user id and password with a submission action of this data once entered. With a valid user confirmed, the server-side application evaluates the submitted E-form fill-in data. Step 24 checks a set of visibility flags associated with approval signature elements, which would be interpreted by the server-side application in order to build a table of the required routing.

One embodiment of the present invention uses a self-directed anonymous routing technique where the E-form contains the title (or other anonymous designator) of the users to which the form requires routing in the form of signature form fields. These signature form fields have visibility flags signifying whether the fields are visible depending on the routing designee and based on the business rules in the linked programmatic elements. At this stage, the server-side application sends a request in step 25 to the submitting user to identify the next, or all subsequent, users to whom the form should be routed. The request to the submitting user, via HTTP and could be in the form of HTML or PDF, can include the title (or other anonymous designator) providing sufficient description for the submitting user to provide the correct actual user names. The submitting user would provide user names, user ids, or some other designator, to this routing user request and submit this data to the server-side application. The server-side application would validate the user information provided using either a database native to the application, or interrogate a directory services application (e.g. LDAP, DNS, etc.). Step 26 checks whether the user information provided is valid. If not valid, the server-side application would request the submitter for correct/new information. If the route-to user information is detected in step 27, step 28 provides confirmation of submission and acceptance of this routing information to the user. As a business application, it would be preferable to create and store in step 29 a transaction log and store in step 30 the E-form completed data into a commercial database management system. In one implementation of the present invention, the server-side application builds in step 31 an email message with a link to the E-form (including its fill-in data). In the preferred embodiment, the server-side application provides a mechanism for notifying users that E-forms are in their input queue awaiting action. This may be implemented, such as creating in step 33, an aging timer for each E-form being routed by the server-side application. The aging timer can be used to alert users, based on a configurable number of days, that an E-form in their queue (routed to this user) has no action after a number of days have passed. At this stage, the server-side application can send, in step 32, email (or other messaging technique) to the first route-to user making the initial form flow submission for this E-form complete in step 34.

Figure 10:
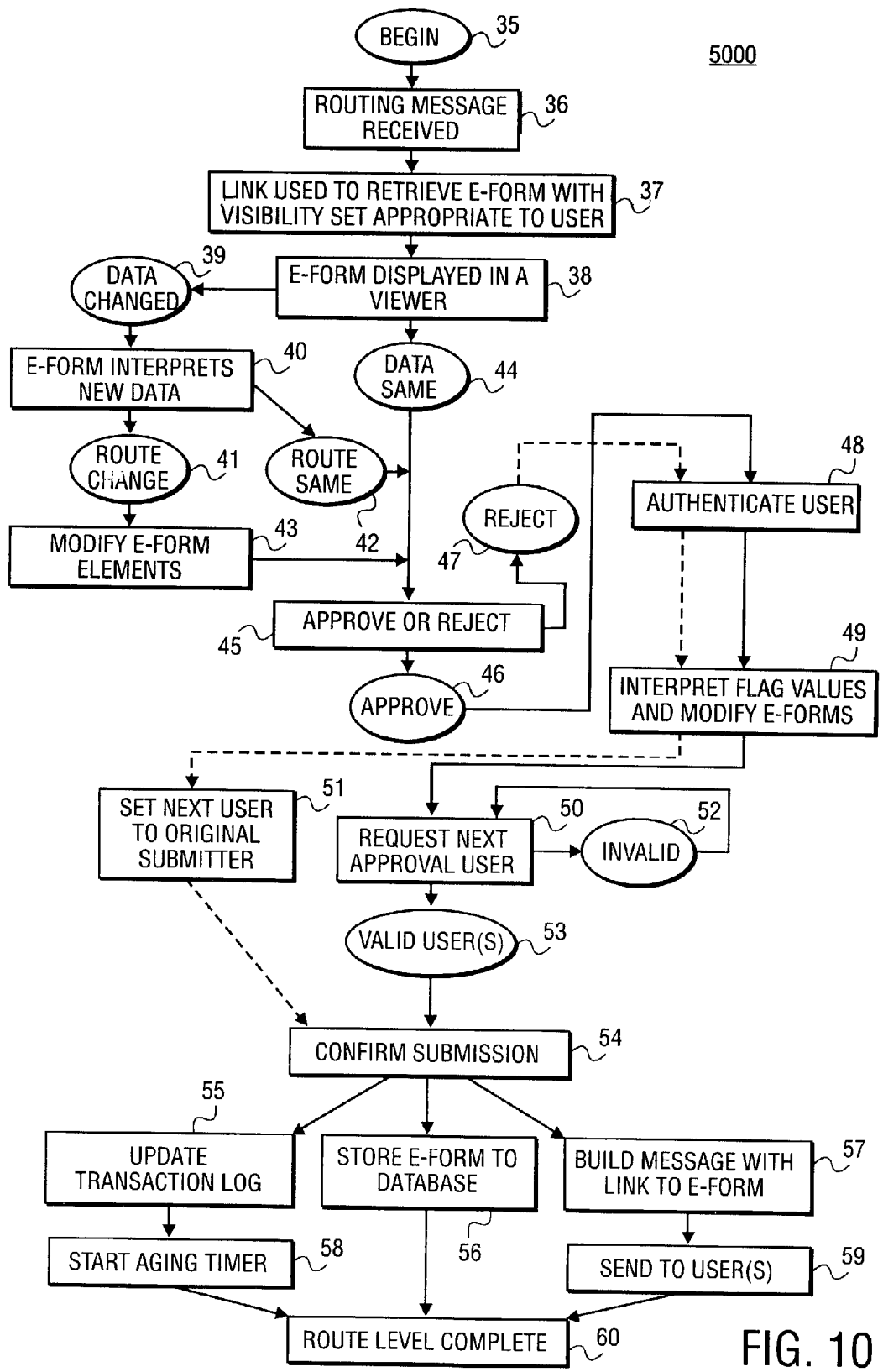
FIG. 10 is a flow diagram of the server-side application routing the electronic form to a user for approval or rejection.

FIG. 10 is a flow diagram of the server-side application routing the electronic form to a user for approval or rejection as shown in process 5000. Step 35 begins the first and subsequent user approval process following initial user E-Form submission. In step 36, the first approver receives an email (or notification via some messaging technique) with a link (such as link process 9B of FIG. 7) to E-form with completed data. In step 37, the link to the E-form in this message is used to request, via HTTP, a copy of the E-form (including completed data) displayed in the approver's browser, and a visibility flag is also set corresponding to signature/approval visual elements for the first approver on E-Form stored in a database on its initial submission during step 30 of routing process 4000 (FIG. 9). In step 38 of FIG. 10, the E-form and it's fill-in data is displayed for the first approver. In step 39, upon viewing the filled in E-Form, if the user chooses to modify some fill-in data on the E-form, then in step 40, server-side routing process 5000 interprets this new data to determine whether to invoke programmatic elements process 9C of FIG. 7 to change the implied routing.

Step 41 provides for changing routing if new routing is determined from step 40. In step 43, E-Form routing is modified accordingly for required subsequent approvals. Then, following step 43, the approval routing process converges to step 45 to detect user approval or rejection.

However, if the first approver does not submit new changes and data thus remains the same in step 44, the approver may now either approve or reject the E-form in step 45. In the case of rejection, one implementation of the server-side application 5000 is to require an authentication step 48 to authenticate the user. Upon verifying the rejecting user, server-side application 5000 then in step 49 interprets various flags in the E-form based on the rejection to reset the E-form back to step 51 to resubmit the form back to the original submitter of the E-form. In resetting the E-form back to a submitter, the approve and reject buttons would be hidden and a re-submit button could be made visible. The server-side application 5000 could then request in step 54 the rejecting user to confirm this action and on confirmation update the transaction log in step 55 and store the E-form to a database in step 56, the changes making this a rejected E-form in the database. An email message, with a link to the reset E-form, is generated in step 57 by the server-side application 5000, and that email is sent to the current submitting user in step 57. Server-side application 5000 also then resets the aging timer in step 58, because the next user in queue is now changed back to the submitting user. The rejection is now complete, and with the E-form being in a new user's queue (the submitter), the routing level process is then completed in step 60.

Figure 11:
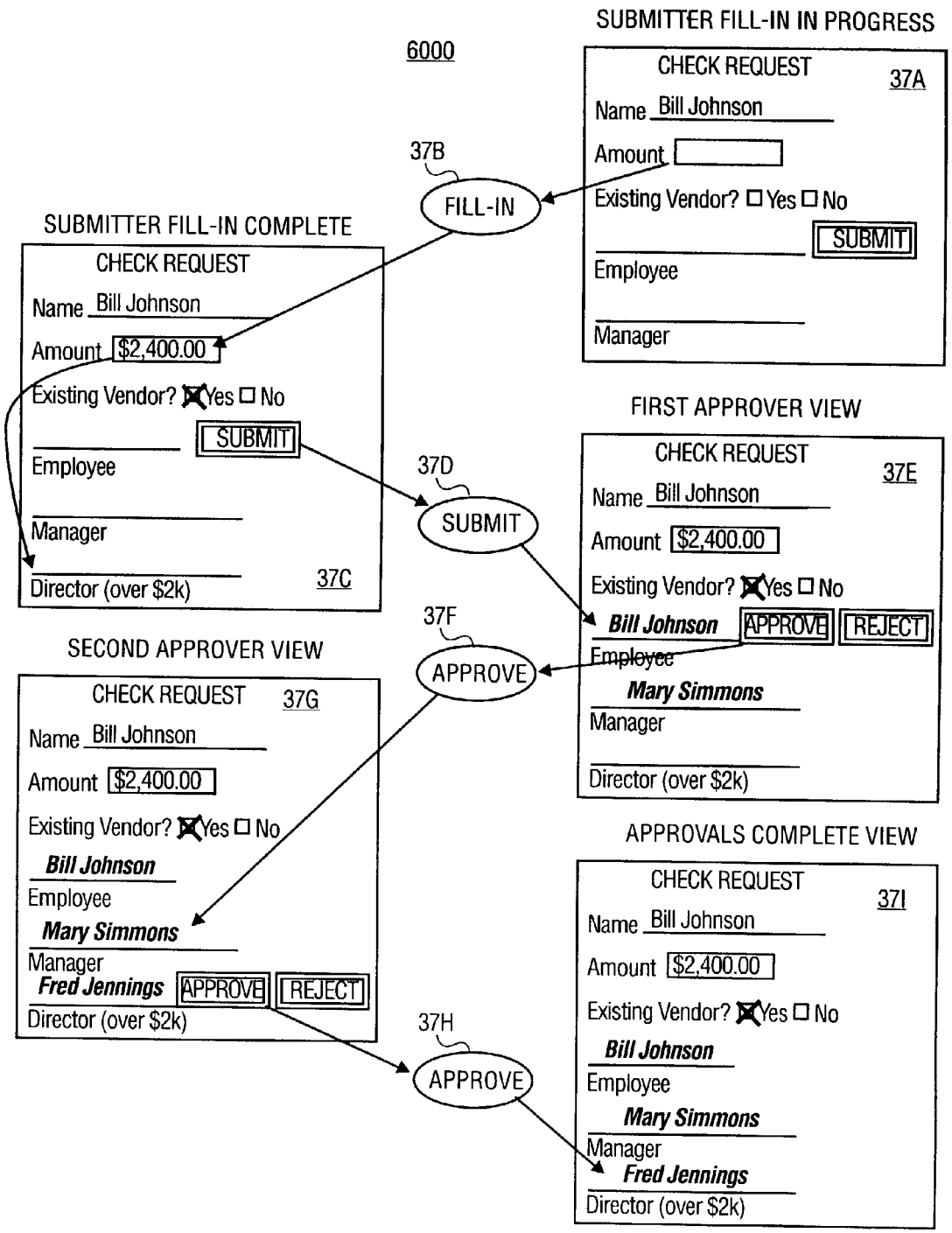
FIG. 11 is an illustration of the main visual aspect of the present invention.

FIG. 11 is an illustration of one embodiment of the main visual aspect of the present invention. Referring back to FIG. 10, in the case of an E-Form approval, such as back in step 46 of routing process 5000, server-side application 5000 authenticates the user in step 48 (FIG. 10). Upon authenticating the approving user, server-side application 5000 then interprets various flags in step 49, changing the E-form in step 50 to a state relevant to the next approver in the approval routing stage of the E-form. Corresponding to the original submitter's data completed, values entered in data fields to be interpreted by programmatic elements (such as process 9C of FIG. 7) visually changes E-form 8G, such as illustrated here in FIG. 11. For example, if prior submitter completed form 37C, signatures/approvals required are then submitted in step 37D to the next approver. In the case of FIG. 11, entry field "Amount" of more than $2K, for example, is designed to require an additional required signature/approval of a "Director". As the E-form is submitted in step 37D to the next user, the present invention applies a dated signature proxy for the submitter and provides the first approver with a view of E-form 37E, showing their names on the E-form, in the location of the signature line within the approval process. One implementation to distinguish users who have completed their action (i.e., Bill Johnson in E-Form 37E) from those being requested to perform some action (i.e., Mary Simmons in step 37E), routing process 5000 preferably provides a colored background to the name on the E-form. Server-side application 6000 could then request the name of the next approver. The server-side application would validate that the user name provided was valid, such as in step 53 of submission process 5000. This might be done by communication with a directory services application. If the user provided was detected in step 52 as invalid, the server-side application 5000 would return back to step 50 to request another name or clarification. If the user were determined to be valid in step 53, the server-side application would ask this approver to confirm submission in step 54. This action and confirmation causes an update to the transaction log in step 55 and storage of the E-form in step 56. The changes make this a rejected E-form in the database. This approval action step 37F (FIG. 11) would then set flags within the E-form to signify the approval of the D-form (colored background applied to Mary Simmons in E-Form 37G). An email message, with a link to the E-form as previously described in step 57 (FIG. 10) is now set to the next approver, and is generated by the server-side application and sent to the user in step 59. The server-side application could also then reset, in step 58, the aging timer, because the user whose queue the E-form is now in has changed to the next approver. The first approver level is now complete, and with the E-form being in a new users queue (i.e., approver number 2). The routing level is then completed in step 60.

As the E-form continues on to more approvers, the same sequence applies where each approver is provided with a view of the E-form with their name on the signature line for which their approval is requested. In continuing the example in FIG. 11, approver Fred Jennings goes from viewing the requested action 37G, to view his approval step 37H and approved E-Form 37I. If the E-form's processing is complete, one implementation of the present invention provides a visual indication to that effect on the E-form.

The present invention provides for visual and non-visual elements that are contained in an electronic form of any format, which based on user data input/interaction, dynamically change the visual appearance of the form. This visual change is accomplished on the client machine and does not rely on communication with a server-side application. The present invention uses these visual changes to the electronic form's anonymous signature lines, labels and messages to guide the routing of the form to other users. One embodiment of the present invention therefore provides a method for a self-directed electronic form that supports a self guided routing strategy based on user data input.

Another embodiment of the present invention improves the self-directed adhoc routing approach by heuristically modifying routing based on learning from a past history of E-form routing. This new technique is called "learned routing". This is an improvement to the current system and approach, because each user in the process (of which there could be many) simply confirms the heuristically generated routing destination, or selects from a list of heuristically generated routing selections, instead of having to explicitly enter the name or identity of the next user in the routing flow. The present invention also improves upon the art by speculating future user choices based on past user selections for an equivalent type of process.

In the present invention, a technique and system is defined to facilitate the electronic routing, approval and management of an electronic form-based business process A "form-based" business process is simply one that involves collecting data (in a form) and then moving that form with data to any number of users for review and approval. The list of approvers, typically the list of anonymous titles next to signature/date lines on a form where each individual is expected to sign their name, defines the serial approval routing for most business processes today. An example of a typical form-based signature list is shown in FIG. 12. The present invention uses this anonymous title signature list to define the form's routing, but dynamically changes (the number of signatures and the anonymous titles) the list based on business rules.

In the present invention, as described earlier in this document, the electronic form presented to the user will typically have buttons to provide the process functionality (Submit, Approve, Reject, Transfer) based on the stage of the process. For example, if a user is filling in a blank electronic form, the buttons available might be only Submit and Transfer, whereas the first approver after the submission of the form would have Approve, Reject and Transfer buttons active. Each transaction (Submit, Approve, Reject, Transfer) moves the process (and the form) from one user queue to another user queue based on a previous user identifying a subsequent approver. In the present invention, the on-going routing transaction information is stored in a database in order to build a process routing knowledge base (PRKB) for using past routing knowledge to learn what should happen in future routing transactions.

FIG. 13 illustrates one embodiment of a structure of the process transaction history 1300 that should be stored in order to create this PRKB. In this sample embodiment, the data structure of the PRKB 1300 includes a column and row database table structure. The columns represent the process transaction information (i.e. user identity, process type, title from, title to, user to, time, and action) and the rows represent each unique entry. It will be apparent to one of ordinary skill in the art that other equivalent PRKB structures could be implemented.

In one embodiment of the present invention, the process transaction information captured in the PRKB 1300 is defined as follows:

User ID: This is the identity of the current user for whom a form is being routed. The User ID identifies the user who is initiating the routing transaction.

"Process Type": The form being acted upon by the current user relates to a particular type of business process. For example, the form may be a timesheet, travel authorization, expense report, etc. The "Process Type" identifies the type of process to which the routing transaction relates.

"Title From": Members of an organization may assume various roles or titles within an organization. For example, an organization may have a Chief Executive Officer (CEO), a Marketing Director or Payroll Clerk, etc. These titles/roles may be assumed by various specific people or users at various times. But, the title names remain constant. The "Title From" data in the PRKB 1300 identifies the title/role which the current user holds at the time the current routing transaction is initiated.

"Title To": This data item identifies the title/role of the person to whom the current user is routing the current form. "Title To" identifies the destination of the current routing transaction by title of the destination user.

User To: This data item identifies the User ID of the person to whom the current user is routing the current form. "User To" identifies the destination of the current routing transaction by User ID of the destination user.

Time Stamp: The time, day, and year of the current routing transaction.

Action: The action performed that caused the routing. For example, the current user may have activated a "Submit", "Transfer", "Approve", or "Reject" button thereby casing a routing transaction.

As database storage is not infinite, a system parameter would allow the maximum number of records to be stored in the PRKB per "Process Type". As an example, this parameter might be set to 10 (ten) using a first-in-first-out (FIFO) scheme so that the records in the PRKB are the most recent history.

Figure 15A:
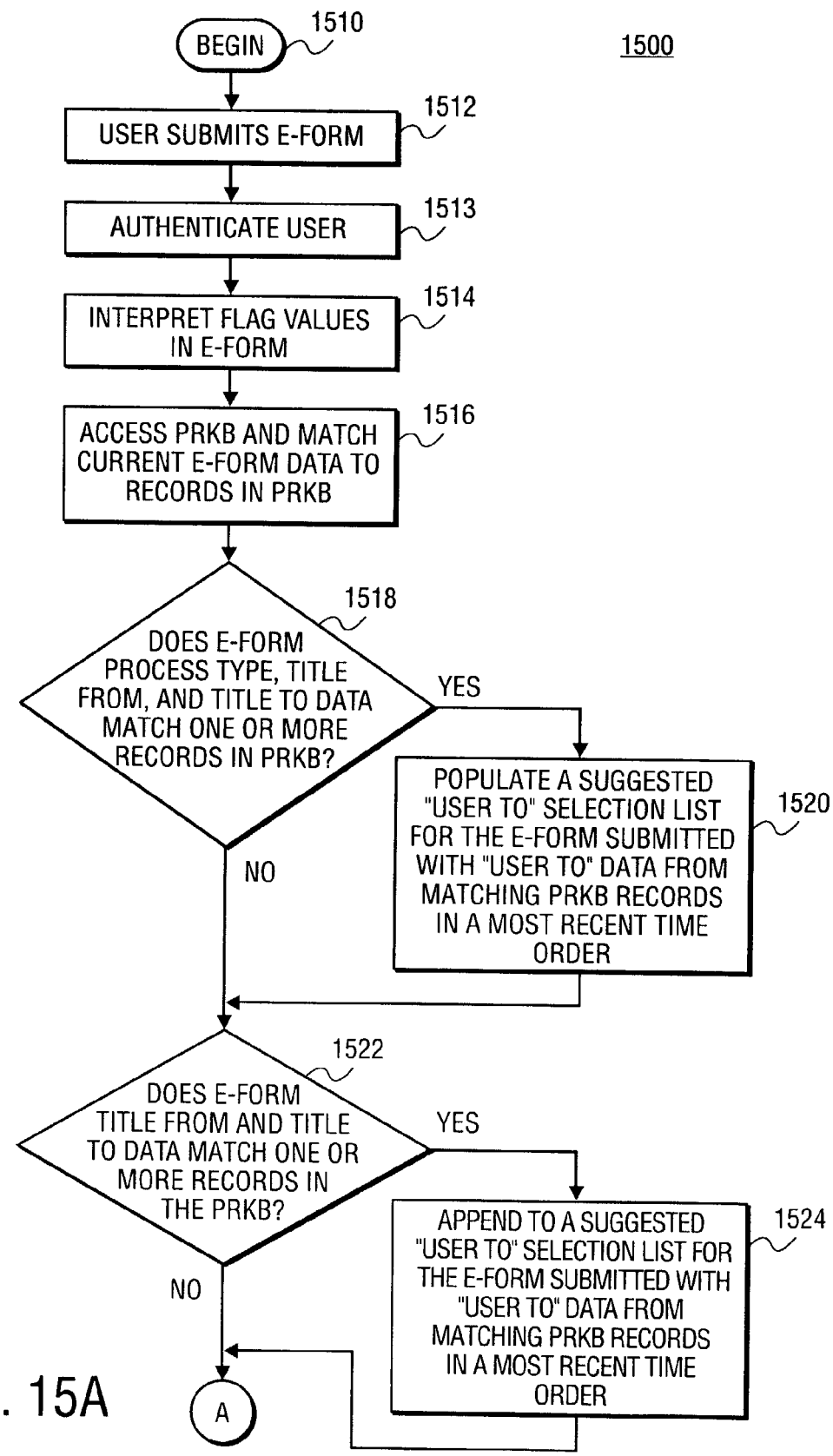
FIGS. 15A–15C are flow diagrams illustrating the processing performed on a submitted E-form for which a heuristically generated selection list is created.
Figure 15B:
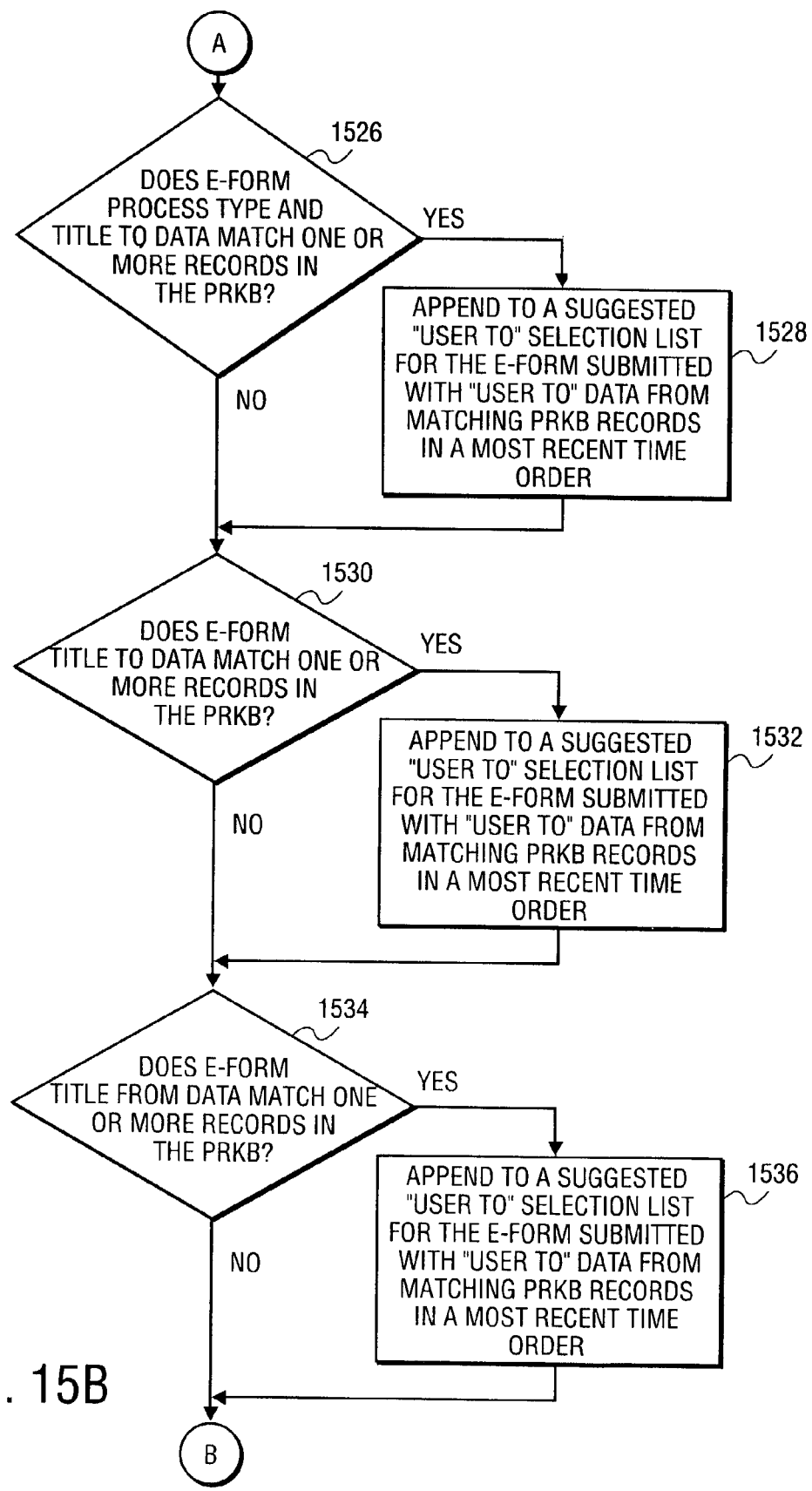
Figure 15C:
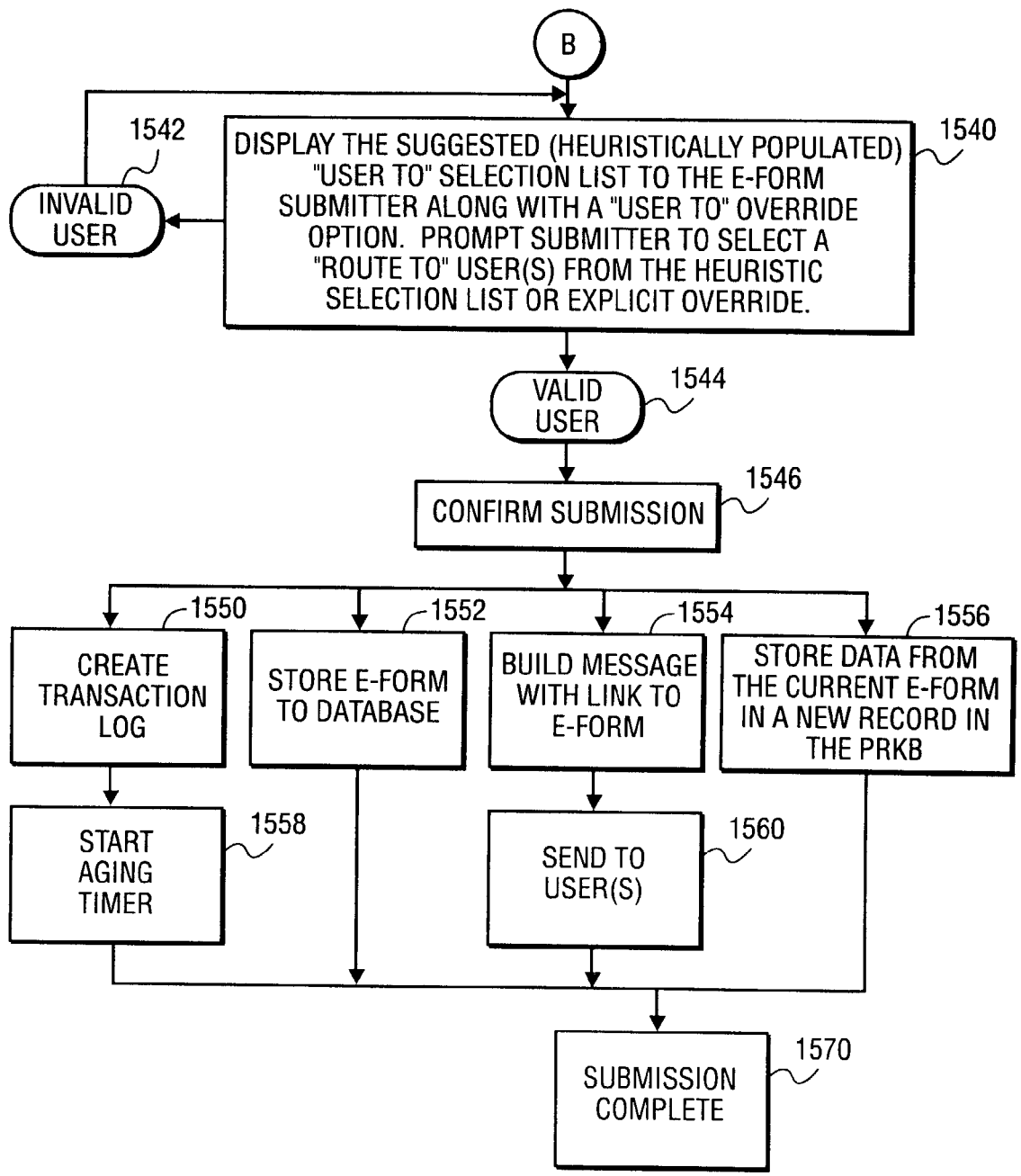

FIGS. 15A–15C illustrate one embodiment of the present invention for heuristically providing a list of choices to the user (i.e. a suggested "User To" selection list or simply, the selection list) when a routing (moving a process pointer from one user's queue to another user's queue) of the electronic form is taking place. Upon a user (i.e. an E-form submitter) initiating a routing action (Submission, Approval, etc.), which is mostly likely done by clicking on a button in a graphical user interface, the present invention provides the user with a graphical means of selecting the next user, such as a selection list or pull-down list as shown by example in FIG. 14. This selection list is populated based on applying the learned routing target algorithm against the PRKB as will be described in more detail in connection with FIGS. 15A–15C.

Referring to FIGS. 15A–15C, flow diagrams illustrate the processing of a completed forms submission wherein a heuristically generated selection list is used. This process 1500 is used to submit a completed form to a server-based routing component resident in a server-side application. With the E-form having its data entry stage completed, a method for the submission of the completed data to a server-side application allows the implementation of an electronic form flow or routing of the E-form. In step 1512, submission of data to a server-side application is initiated such as via a graphical button labeled "Submit". In performing the step 1512 submit action, via clicking on a button, a programmatic element within the E-form will transmit a request to submit the completed data to a server-side application. The transmission of this request, or data, to and from the E-form could be implemented with the hypertext transfer protocol (HTTP) if the E-form is used from a web browser. In this implementation, the E-form element that submits a request, or data, to the server-side application sends the request to a specific port of a server machine. On that server machine, a web server is listening to that port for requests. In one embodiment of the form flow server-side application, step 1513 requires user authentication by requesting a user identification (ID) and a user password. This user authentication could be implemented by querying the user via a web browser for user ID and password with a submission action of this data once entered. With a valid user confirmed, the server-side application evaluates the submitted E-form fill-in data. Step 1514 checks a set of visibility flags associated with the approval signature elements, which would be interpreted by the server-side application in order to build a table of the required routing.

In one embodiment of the present invention, starting at block 1516, the E-form routing process must determine to which user or users the form should be routed next in the E-form routing flow. In block 1516, the routing process accesses the process routing knowledge base (PRKB) and attempts to match the current E-form data with records in the PRKB. In block 1518, the routing process attempts to match the E-form "Process Type", "Title From", and "Title To" data items with one or more records in the PRKB. If one or more records in the PRKB match, processing block 1520 is executed. In block 1520, a suggested "User To" selection list for the E-form submitter with the "User To" data from matching PRKB records in a most recent time order is created. In block 1522, the form routing process again queries the PRKB and tries to match the E-form "Title From" and "Title To" data with one or more records in the PRKB. If one or more records in the PRKB match, processing block 1524 is executed. In block 1524, the matching records from the PRKB are appended to the suggested "User To" selection list for the E-forms submitter. In this manner, the routing process begins to build the suggested "User To" selection list with the most likely user destinations inserted at the top of the list in block 1520 and somewhat less likely destinations appended to the bottom of the list at block 1524. Routing process control flow then continues at the bubble labeled A as shown in FIG. 15B.

Referring now to FIG. 15B, the routing process again queries the PRKB database to attempt to match the E-form "Process Type" and "Title To" data with one or more records in the PRKB. If one or more records match, processing block 1528 is executed. At block 1528, matching records from the PRKB are appended to the suggested "User To" selection list. At block 1530, the routing process matches the E-form "Title To" data with records in the PRKB. if one or more matching records are found, processing block 1532 is executed. At block 1532, the matching records from the PRKB are appended to the suggested "User To" selection list. Finally, at block 1534, the E-form "Title From" data is matched with records in the PRKB. If one or more records match, the matching PRKB records are appended to the suggested "User To" selection list in block 1536. Routing process control flow then continues at the bubble labeled B illustrated in FIG. 15C.

Referring now to FIG. 15C, the routing process of one embodiment of the present invention continues at the bubble labeled B. Once the heuristically created user selection list is created following the processing performed in blocks 1520, 1524, 1528, 1532, and 1536, the heuristically populated suggested "User To" selection list is displayed to the E-form submitter in block 1540. In one embodiment of the present invention, a "User To" override option is also displayed for the E-form submitter. The "User To" override option allows the submitter to explicitly specify a user ID destination for the submitted E-form. In this manner, instead of using the heuristically generated selection list, the submitter may use the override option to explicitly specify a destination for the E-form. It will be apparent to one of ordinary skill in the art that many optional implementations of the heuristic process of the present invention may be implemented. Similarly, it will be apparent to one of ordinary skill in the art that the embodiment of the present invention may be implemented with or without an override option. Also in block 1540, the E-form submitter is prompted to enter a "route to" user or users from the heuristic selection list or the explicit override. Following a selection of users, the routing process determines if the selected users are valid users. If a selected user is invalid, the process returns to block 1540 through bubble 1542 for selection of a new valid user. If the selected users are valid, the routing process continues at block 1546 through bubble 1544. At block 1546, the routing process provides confirmation of the submission and acceptance of the routing information to the user. As a business application, it would be preferable to create and store in block 1550 a transaction log and to store in block 1552 the E-form completed data into a commercial database management system. In one implementation of the present invention, the routing process builds in block 1554 an email message with a link to the E-form (including its fill-in data). In one embodiment of the present invention, the routing process provides a mechanism for notifying users that E-forms are in their input queue awaiting action. This may be implemented, such as creating in block 1558, an aging timer for each E-form being routed by the routing process. The aging timer can be used to alert users, based on a configurable time period, that an E-form in their queue (routed to this user) has no action after the time period has passed. As an additional step in one embodiment of the present invention, the data from the current E-form is stored in a new record in the PRKB in order to retain the history of the routing for the current E-form (block 1556). At this stage, the routing process can send in step 1560 email (or other messaging technique) to the first route to user making the initial form for submission for this E-form complete in step 1570.

Figure 16:
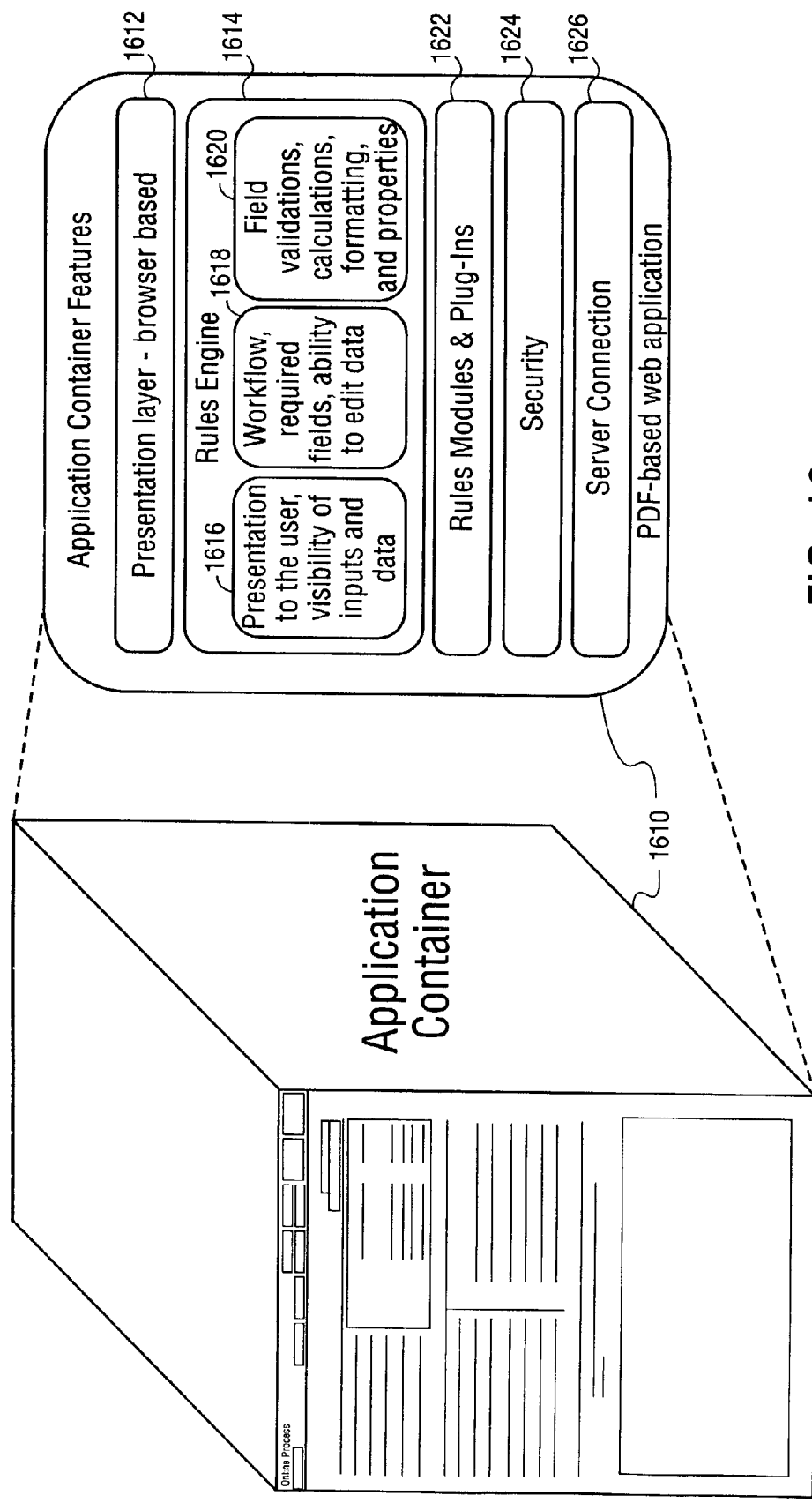

As another perspective on the present invention, the claimed system and method can be considered to include a client side application container and a server side application. This perspective of the present invention is illustrated in FIGS. 16–18. Referring to FIG. 16, the client side application container 1610 of the present invention includes processing logic and data to present an electronic form to the client side user and to manage locally the input and initial processing of data entered into the form by the user. In particular, application container 1610 includes a presentation layer 1612, which is a browser-based user interface with which a user may interact with various fields, buttons, check boxes, or other data or input items on a particular electronic form. In addition, application container 1610 includes a rules engine 1614, which drives the customized display and control of various fields and data items presented to the user on the electronic form. In particular, rules engine 1614 includes a component 1616 to configure the visibility of input and data for presentation to the user. In addition, rules engine 1614 includes a work flow component 1618 to configure the various data entry fields for data entry and editing functions. Rules engine 1614 also includes a component 1620 to configure data fields on the electronic form. Component 1620 includes logic and data to perform field validation, calculation, and formatting. In addition, properties for each of the fields on an electronic form are maintained within component 1620. Application container 1610 also includes rules module and plug-in component 1622. Component 1622 is used to retain various configurable rules modules and browser plug-ins that may be used to configure a particular application container for a specific application. In this manner, the application container 1610 can retain a customized executable computer program, which may interpreted by a client side application, such as a browser or other application. Application container 1610 also includes a security component 1624. Security component 1624 provides a secure shell around application container 1610 thus preventing unauthorized users from seeing, using, or modifying embedded programs or field properties or data retained within application container 1610. Finally, application container 1610 includes a server connection component 1626. The server connection component 1626 provides the application container 1610 with the ability to communicate with a server side system via conventional HTTP, TCP/IP, COM, SOAP, or other conventional network protocols. In this manner, application container 1610 may establish a connection with a server computer for the transfer of information and instructions.

Referring now to FIGS. 17 and 18, the electronic form submission process used with application container 1610 is described. Referring to FIG. 17, application container 1610 is shown in networked communication with a server computer 1710. The processing flow illustrated in FIG. 17, illustrates the initial electronic form submission process of one embodiment of the present invention. In an initial step, server 1710 sends an application container 1610 to a client side system in step 1720. As part of this initial application container transmission, server 1710 may also send initial field properties and/or field data as part of the electronic form embodied within the transmitted application container 1610. On the client side system, the application container 1610 presents the initial electronic form to a user. In step 1724, the user fills in data on the electronic form as interpreted and managed locally by the application container 1610. The client side processing logic within application container 1610 guides the user through the electronic form data input process, performs data input validation, performs field calculations, displays results, and performs business rules on the electronic form data input flow and shows the resulting changes in the electronic form by visually presenting or hiding various electronic form elements and/or changing information or data entry fields corresponding to data input in other portions of the electronic form. As an important advantage of the present invention, all of this electronic form processing is performed locally by the client resident application container 1610. Once the client side user completes the data input process on the electronic form and the corresponding processing logic of the application container 1610 validates the input, the user initiates submission of the completed electronic form to server 1710 in step 1726. In step 1726, the user submits the completed electronic form along with the current state of the field properties and the data embedded in the electronic form to server 1710. In response, server 1710 receives the completed electronic form and initiates the transfer of the received electronic form to other users in a work flow process as defined by the content of the received electronic form.

Referring now to FIG. 18, the application container 1610 is shown in networked communication with server 1710. In the processing flow illustrated in FIG. 18, the electronic form processing performed after initial form submission is illustrated. In step 1720, server 1710 sends an application container 1610 to a client side system. In step 1722, the application container sent to the client side system may include field properties and data associated with the electronic form embodied in the application container 1610 sent to the client side system. On the client side system at step 1824, the client side application container 1610 interprets the field properties and data associated with the electronic form embedded in the application container 1610. Using business rules and presentation layer processing logic resident on the client side system, application container 1610 displays the appropriate configuration of fields and data associated with the electronic form. If the client side user manipulates or otherwise interacts with the electronic form of the client side application container 1610, the application container 1610 may initiate a transfer of information to/from server 1710 in order to effect a change or manipulation of data in the electronic form. However, such transfers of information from/to client to/from server 1710 may not be necessary as much of the electronic form processing may be accomplished on the client side system using logic within application container 1610.

Using the application container concept of one embodiment of the present invention, the present invention provides the benefit of being a distributed computing environment providing data input validation, intelligence, and application of business rules and the like, which may be accomplished by the execution of processing logic on a client side system without frequent and expensive interaction across a network with a server system. In this manner, many users in a distributed computing environment may use and initiate electronic forms submission without the need for massive computer resources on the server side. In a typical scenario, the server application and the client side application container are connected via a user session where the user is initially authenticated through conventional means. Subsequently, the client side user will then only communicate with the server, via the application container server connection 1626, to request or commit data. Given the reduced load on server resources, the server system may therefore support a greater number of client side application containers. For example, a given system may contain all finance related processes (for example, expense reporting, purchase requisition, check requests, etc.) as application containers. In one embodiment of the present invention, the application container may be implemented as Adobe Acrobat PDF™ but could also be implemented with other conventional electronic forms technology.

Thus, a computer network-based system and method for self-directed routable electronic forms is disclosed. Although the present invention is described herein with reference to a specific preferred embodiment, many modifications and variations therein will readily occur to those with ordinary skill in the art. Accordingly, all such variations and modifications are included within the intended scope of the present invention as defined by the following claims.

What is claimed is:

1. A learned routing electronic form generation system comprising:
   a computer coupled to each of one or more visual displays, wherein the computer generates one or more learned routing electronic forms, wherein each learned routing form includes:
      a plurality of visual elements comprising text or data fields and graphical elements for receiving user data input; and
      a plurality of non-visual programmatic elements that are linked to the plurality of visual elements to process the received user data input, wherein the computer processes the received user data input to automatically change the plurality of visual elements or the plurality of non-visual programmatic elements in response to the received user data input without server interaction, the plurality of non-visual programmatic elements further including elements to populate a heuristically generated routing selection list based on a history of previous routing transactions; and
   a second computer, wherein a server-side application processes the received user data input and uses the heuristically generated routing selection list to allow a user to either confirm the routing selection list or select one or more recipients from the routing selection list.

2. The learned routing electronic form generation system of claim 1 wherein upon submission of a completed electronic form by user, the server-side application uses the received user data input provided by the completed electronic form to query a submitting user to identify one or more subsequent users for form routing by making a selection from the heuristically generated routing selection list.

3. The learned routing electronic form generation system of claim 2 further comprising providing the submitting user one or more visual clues on the form for a learned routing approach.

4. The learned routing electronic form generation system of claim 3 wherein with each successive route by the server-side application to each subsequent user, a form routing path defined by a previous user may be invalidated by a subsequent user modifying some of the received user data input in the electronic form.

5. A learned routing electronic form generation process comprising:
   generating by a computer one or more automated electronic forms, wherein generating each automated electronic form includes:
      providing a plurality of visual elements having text or data fields and graphical elements for receiving user data input; and
      providing a plurality of non-visual programmatic elements that are linked to the plurality of visual elements to process the received user data input, the plurality of non-visual programmatic elements further including elements to populate a heuristically generated routing selection list based on a history of previous routing transactions,
   wherein the computer processes the received user data input to automatically change the plurality of visual elements or the plurality of non-visual programmatic elements in response to the received user data input without server interaction; and
   providing a server-side application residing on the computer to selectively provide the received user data input over the server to another computer, wherein the server-side applications processes the received user data input and uses the heuristically generated routing selection list to allow a user to either confirm the routing selection list or select one or more recipients from the routing selection list.

6. The learned routing electronic form generation process of claim 5 wherein upon submission of a completed electronic form by user, processing by the server-side application the received user data input provided by the completed electronic form to query a submitting user to identify one or more subsequent users for form routing by making a selection from the heuristically generated routing selection list.

7. A learned routing electronic selection form tangibly embodied on a computer-readable medium for display on an electronic system comprising:
   a plurality of visual elements including text or graphical elements displaying one or more recipients to whom one or more work flow transaction types have been previously routed by a submitting user; and
   a display of the most likely recipients of any new work flow transaction processed by the submitting user as determined by a heuristic analysis of types of work flow, roles of the submitting user, titles of potential recipients of any work flow transaction, and dates of any work flow transactions recently routed by the submitting user,
wherein the submitting user may select from the display one or more routing recipients for a new work flow transaction or enter a new routing recipient, wherein a record of the recipient of the new work flow transaction is added to the knowledge base of the submitting user's history of any work flow transaction for heuristic analysis and possible display to the submitting user in a future learned routing electronic selection form.

* * * * *